US008715759B2

(12) United States Patent
Larson

(10) Patent No.: US 8,715,759 B2
(45) Date of Patent: May 6, 2014

(54) METHOD AND APPARATUS FOR ANTIMICROBIAL TREATMENT OF MEAT TRIMMINGS FOR SUBSEQUENT GRINDING

(75) Inventor: LaWayne Larson, Fort Collins, CO (US)

(73) Assignee: Birko Corporation, Henderson, CO (US)

( * ) Notice: Subject to any disclaimer, the term of this patent is extended or adjusted under 35 U.S.C. 154(b) by 66 days.

(21) Appl. No.: 13/410,205

(22) Filed: Mar. 1, 2012

(65) Prior Publication Data

US 2012/0225173 A1    Sep. 6, 2012

Related U.S. Application Data

(60) Provisional application No. 61/464,249, filed on Mar. 1, 2011.

(51) Int. Cl.
*A23B 4/20* (2006.01)
*A23F 5/00* (2006.01)
*A23B 7/154* (2006.01)
*C12H 1/10* (2006.01)
*A01J 11/04* (2006.01)
*B60H 3/02* (2006.01)

(52) U.S. Cl.
USPC ........... 426/332; 426/302; 426/310; 426/321; 426/326; 99/467; 99/477; 99/478; 99/479

(58) Field of Classification Search
CPC .............. A23B 4/30; A23B 4/20; A23B 4/24
USPC ................. 426/302, 310, 332, 321, 326, 532; 99/467, 477, 478, 479, 433, 485, 516, 99/534
See application file for complete search history.

(56) References Cited

U.S. PATENT DOCUMENTS

| 3,798,338 A | 3/1974 | Galle |
| 5,484,615 A * | 1/1996 | Kounev ......................... 426/238 |

(Continued)

FOREIGN PATENT DOCUMENTS

WO    WO2007/024867    3/2007

OTHER PUBLICATIONS

3M Completes Acquisition of Biotrace International PLC; Nov. 28, 2006.

(Continued)

*Primary Examiner* — Rena L Dye
*Assistant Examiner* — Lela S Williams
(74) *Attorney, Agent, or Firm* — TraskBritt, P.C.

(57) ABSTRACT

An antimicrobial intervention for the production of ground meats by treating the exterior of the meat trimmings with an antimicrobial agent before grinding. An apparatus for applying an antibacterial agent to meat trimmings includes a closed or essentially closed chamber for limiting the escape of the antimicrobial agent to the environment during antimicrobial treatment of the trimmings, an entrance system for introducing trimmings into the closed chamber while preventing or significantly limiting the antimicrobial agent from escaping into the environment, an application system for applying an effective amount of the antimicrobial agent to exposed surfaces of the trimmings in the closed chamber; and an exit system for removing the treated trimmings from the closed container while preventing or significantly limiting the escape of antimicrobial agent into the environment.

19 Claims, 15 Drawing Sheets

(56) References Cited

U.S. PATENT DOCUMENTS

| | | | |
|---|---|---|---|
| 5,964,146 A | 10/1999 | Kelly et al. | |
| 6,120,822 A * | 9/2000 | Denvir et al. | 426/320 |
| 2004/0067286 A1 | 4/2004 | Groves et al. | |
| 2005/0257695 A1* | 11/2005 | Dobranski et al. | 99/485 |
| 2008/0241269 A1* | 10/2008 | Velasquez | 424/520 |

OTHER PUBLICATIONS

International Preliminary Report on Patentability and Written Opinion; PCT/US2006/032793 dated Feb. 26, 2008.

Meat, Poultry, Seafood & Eggs; 3M Food Safety Website; http://solutions.3m.com/wps.portal/3M/en_US/Microbiolgy/FoodSafety/industries/two/; taken from website Sep. 4, 2012.

* cited by examiner

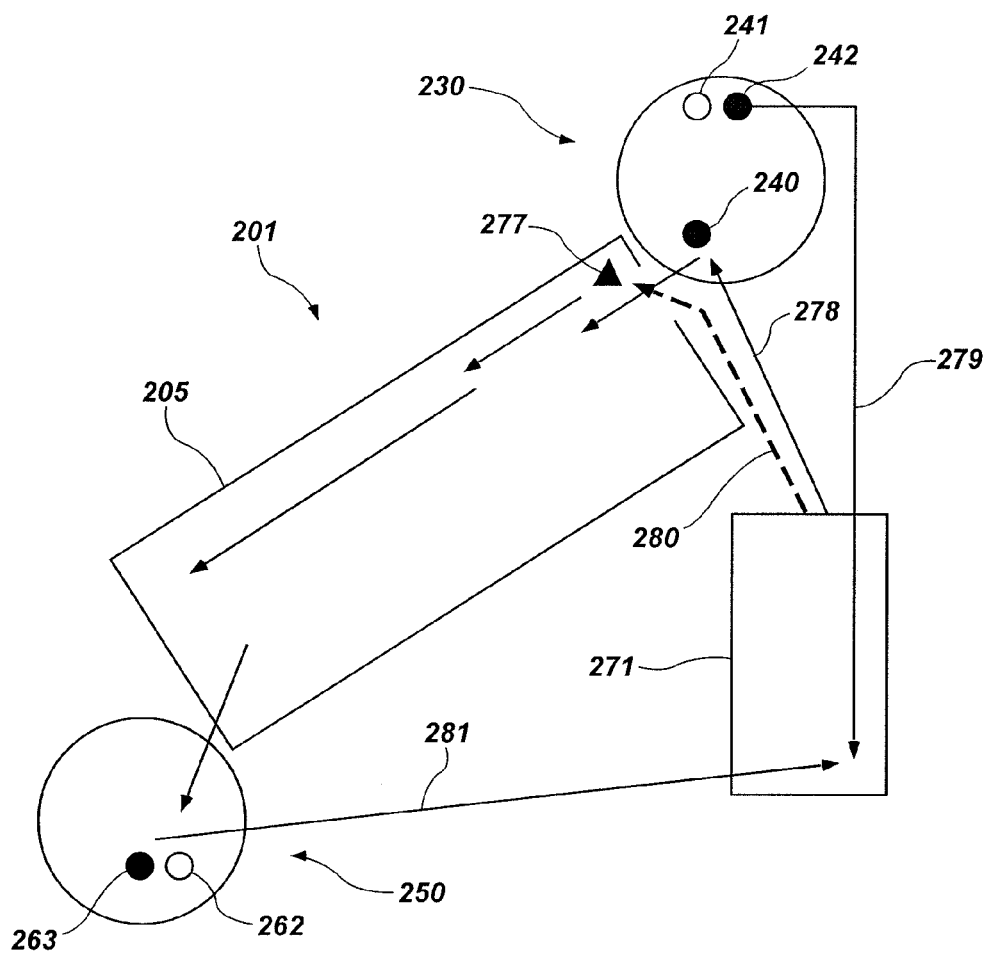
FIG. 12
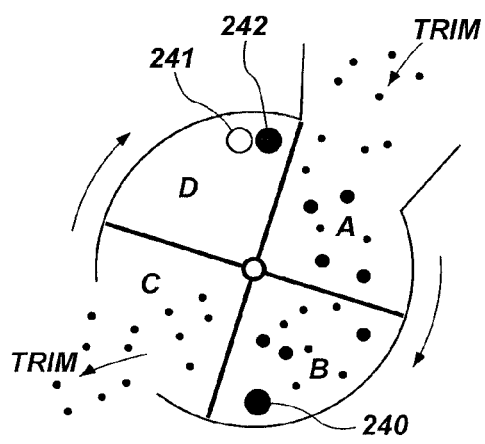
FIG. 12A (230)
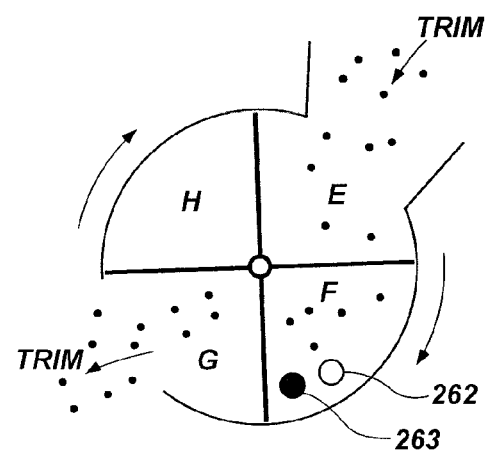
FIG. 12B (250)

METHOD AND APPARATUS FOR ANTIMICROBIAL TREATMENT OF MEAT TRIMMINGS FOR SUBSEQUENT GRINDING

PRIORITY CLAIM

This application claims the benefit of the filing date of U.S. Provisional Patent Application Ser. No. 61/464,249, filed Mar. 1, 2011, for "METHOD AND APPARATUS FOR ANTIMICROBIAL TREATMENT OF MEAT TRIMMINGS FOR SUBSEQUENT GRINDING."

FIELD OF THE INVENTION

The invention relates to sanitization of food products by antimicrobial intervention particularly as applied to meat processing and more particularly with respect to the processing of meat trimmings and other materials that are subsequently ground and/or otherwise processed into ground beef (e.g., "hamburger"), ground turkey, ground chicken, sausage, ground pork, ground turkey, and similar processed items.

BACKGROUND OF THE INVENTION

Food safety is an important issue in the food industry in general and particularly in the industry of supplying protein, i.e., edible meat products, from animals and poultry. By the very nature of the animals and birds, the conditions in which they are grown to suitable size, and the nature of the commercial slaughtering processes, "meat packers" face serious challenges in producing products that pass government and industry standards and are safe for consumption. When a problem arises in the slaughtering process, the consequences can be serious in terms of public health.—exposing many individuals to serious health consequences, including possibly death. Large product recalls of ground beef can result in substantial adverse economic consequences to meat packers, retailers and all those in the intermediate distribution chain.

Many of the health issues in the meat industry involve the transmission and growth of microbial pathogens, e.g., *Escherichia coli* ("*E. coli*;" e.g., *E. coli* 0157:h7), *Salmonella*, *listeria* and other pathogens that can cause sickness and death when ingested by humans. Indeed, *Salmonella* and another pathogen known as "*Campylobacter*" are the two leading bacterial causes of food poisoning in the United States, according to the Center for Disease Control. Encountering an immediate bout of illness caused by these pathogens may not be the only consequence. At least one report indicates that health effects associated with *E. coli* and other microbial pathogens may arise months or even years after the initial incident. ("Food Poisoning Legacy: Health Woes can arise Years after Bout, Doctors say," by Lauran Neergaard reported in The Denver Post, Jan. 22, 2008.) Obviously, it is highly desirable for meat producers to deliver processed meat with minimal incidence of these bacteria.

Despite continuing vigilance for *E. coli* contamination in beef carcasses and processed beef, *E. coli* continues to be a persistent problem. Reported cases of sickness and death continue to occur from red-meat contamination, and the industry continues to be at risk to expensive product recalls to correct deficiencies in meat processing and distribution. These health and economic consequences continue to occur despite significant efforts to avoid.

Nevertheless, there is an increasing demand for zero tolerance of *E. coli* and other microbial pathogens in ground beef (i.e., "hamburger"). Large corporate food retailers (e.g., Wal-Mart) and governmental entities overseeing school lunch programs are promulgating new purchase requirements for hamburger attempting to achieve the zero tolerance goal. While it is possible to promulgate regulations mandating a zero percent tolerance, i.e., incidence, for *Salmonella* and other pathogens in products leaving a production plant, no known process exists at the present time for achieving that lofty and desirable goal.

To address these concerns, antimicrobial compositions are applied at various stages of meat production. Typically they are applied by spray or in a "bath" to whole carcasses and sometimes to "cuts." Often the carcasses are subjected to more than one (and often different) antimicrobial intervention as the carcasses move through processing and are disassembled, chilled and packaged for shipment.

Hamburger is prepared from "trimmings" (sometimes called "trim"), boneless beef or other meat segments that are leftover from carcass disassembly and are accumulated, passed through a grinder, chilled and packaged for shipment. In theory, the trimmings are believed to be safe as components for hamburger, because the carcasses from which they were derived had been treated with one or more antimicrobial interventions. There is concern, however, that in practice the trimmings (particularly the exterior of trimmings) may still be subject to contamination or cross-contamination from other intervening sources.

The problem is exacerbated by the fact that the trimmings are commingled before grinding, and the ground beef is commingled after grinding, so that isolated instances of contamination in portions of the trimmings can be spread through larger portions of the hamburger product. Voluntary efforts by meat processors and requirements from customers and regulatory groups have increased the amount of hamburger testing. Nevertheless, testing can never be complete or thorough enough to catch all possible contamination. For example, testing practices can only validate that the specific portion of the trim or ground beef being tested is free of pathogens. Surfaces not tested, even on the same piece of meat, can be contaminated even though the portion tested evidenced no contamination. Thus, testing—even at extreme levels—cannot ensure that contamination is not present. Historically, meat processors have attempted to address these issues by employing sanitary procedures in the processing stages prior to collection of the trim, so that the trim is not likely to contain pathogenic contamination as it arrives at the grinder.

U.S. Pat. No. 6,326,042, assigned to the University of Missouri, describes an antimicrobial intervention in which heat-treated lactic and/or glycolic acid is mixed in with ground beef. In practice, however, antimicrobial interventions are not employed in ground beef for several significant reasons. Among other things, the application of an antimicrobial agent at this late stage of preparation may be accompanied by discoloration of the meat and "off-smells" or tastes that are offensive or objectionable to potential purchasers and consumers. In addition, such a process would be highly inefficient and not necessarily effective. For example, it would be virtually impossible to contact all portions of the hamburger or those portions that are likely to have been contaminated prior to grinding. Nevertheless, a substantial amount of antimicrobial agent will be unavoidably wasted by spraying onto portions of the hamburger that were not contaminated (i.e., portions coming from the interior of the trim). Finally, any antimicrobial intervention used post-grinding must be disclosed on the label of the hamburger product. Even if an antimicrobial intervention can be found that does not result in objectionable tastes, smells or surface discoloration, the label may significantly discourage sales of the treated product notwithstanding its enhanced safety.

Applicant is aware of one instance in which an antimicrobial has been sprayed on to trimmings in a commercial processing facility as the trimmings were conveyed to the grinder, but the process had a number of difficulties, not the least of which were: (a) questionable effectiveness, since all surfaces of the trim may not have been treated with the antimicrobial agent and (b) environmental and other occupational health issues associated with vaporization of the antimicrobial agent into the working environment. The latter would be particularly objectionable, for example, if the antimicrobial were chlorine dioxide—a highly effective antimicrobial with significant potential environmental and occupational health consequences. The ineffectiveness of such an intervention was demonstrated by a recent trial in which antimicrobial was sprayed on pork trim moving in an auger at 37,000 pounds per hour as the trim approached the grinder. Monitoring of the trim exiting the auger revealed inconsistent microbial reduction, and the trial was halted. The conclusion was reached that the antimicrobial did not come in contract with all surfaces of the meat on a consistent basis.

For these reasons, antimicrobial interventions have not been generally employed to treat either the meat trimmings being fed to a grinder or to the ground hamburger that comes out. Another alternative, i.e., irradiation of the ground beef, has not been generally accepted by the consuming public. Thus, current practices have been limited to the use of vacuum packaging of the hamburger or packaging into a low oxygen or "inert" gaseous environment. These efforts, however, only reduce the further growth of any pathogens inherent in the meat. They do not eliminate the pathogen.

Accordingly, there is a significant industry and public need for improved antimicrobial interventions that can effectively and inexpensively reduce the incidence of *E. coli, Salmonella* and other pathogens in ground meat products, such as hamburger, without adversely affecting the color, smell or taste of the meat or requiring negative labeling.

It is with respect to these and other considerations that embodiments of the present invention have been made. Also, although relatively specific problems have been discussed, it should be understood that embodiments of the present invention should not be limited to solving the specific problems identified in the "background." The present invention has other significant uses including, for example, the efficacious treatment of other meat products and other food products, in general.

SUMMARY OF THE INVENTION

This summary is provided to introduce some concepts of the invention in a simplified form. The invention is defined by the entire contents of this application including, without limitation, the description, drawings and claim(s).

The invention provides an antimicrobial intervention for the production of hamburger ("ground beef") and other ground meats by effectively treating the exterior of the meat trimmings with an antimicrobial agent before grinding. By using a closed or essentially closed environment, the antimicrobial agent may be applied to the meat under conditions (e.g., concentrations and amounts) that are highly lethal to *E. coli* and other pathogens while eliminating environmental and/or employee health concerns. The use of a closed or essentially closed environment also promotes efficient use of the antimicrobial agent. For example, embodiments of the present invention utilize configurations for the movement of trim into and out of the treatment container designed to prevent or minimize the antimicrobial agent from escaping into the work environment and to maintain full impact of antimicrobial action on the trim within the enclosure.

Embodiments of the present invention employ an antimicrobial application chamber in which the trim is treated with antimicrobial. The antimicrobial chamber may take many forms all of which are intended to separate the trim pieces and expose all surfaces of the trim to the antimicrobial.

In one embodiment, the antimicrobial agent is applied by spraying on to the meat trimmings. In a preferred embodiment electrostatic spraying is employed to ensure thorough coating of the meat surfaces to facilitate the antimicrobial intervention.

In another embodiment, application of the antimicrobial agent may be facilitated while the meat trimmings are temporarily or momentarily suspended in the air as the result of a mechanical tumbling, a vertical fall or similar means.

Embodiments of the present invention also involve systems for moving trim into the antimicrobial application chamber and removing the treated trim from that chamber without letting antimicrobial agent escape into the work area. For example, the entrance and exit systems may utilize revolving compartment systems to move the trim while preventing escape of the antimicrobial agent. As applied to the "entrance," i.e., the movement of trim into the antimicrobial application chamber, a revolving compartment, which is open to the outside, receives incoming, untreated trim. The continued rotation of the compartment causes the compartment to contact a stationary, curved outer wall momentarily sealing the compartment—now defined by the walls separating adjacent compartments, stationary sidewalls and the outer, circumferential, stationary wall. In the closed position, the compartment with the trim passes an inlet port used to deliver antimicrobial laden gas/liquid. This begins the application of antimicrobial agent to the trim. The compartment then continues to rotate to an open position unrestrained by the outer curved wall. Here the trim and the antimicrobial agent may enter the main antimicrobial application chamber where more antimicrobial may be applied. Movement of the trim into the main antimicrobial application chamber is facilitated by the physical rotation of the compartments. The compartment—now empty of trim—moves to a next position where it comes in contact with another curved, stationary wall, which again acts to seal the compartment. In that position any remaining antimicrobial may be evacuated and recycled or discarded through a port. Upon creating a seal, the lead compartment wall passes a port on the flat wall of the compartment that is connected to an evacuation tube that removes gaseous components from the compartment for recycling or to be discarded. The same leading rotating compartment wall next passes a second port on the opposing flat stationary chamber wall thereby allowing the vacuum created by the first port relief causing fresh air to fill the compartment. The rate of evacuation will be such that all or substantially all of antimicrobial vapor is removed and replaced by outside air before the lead rotating compartment wall breaks the seal of the lead rotating compartment wall with the curved stationary outer wall. As the compartment continues to rotate, it returns to the original open position where it may receive more untreated trim. Since all of the antimicrobial agent has been removed previously, no antimicrobial agent is present to escape into the work environment. A full rotation of the compartment through 360o is now complete, and trim is again deposited into the open compartment for delivery to the main antimicrobial application chamber.

A similar system of rotating compartments may also be employed as the treated trim is removed from the other end of the main antimicrobial application chamber. Again, appropriate ports remove any antimicrobial agent and permit the replacement of any removed gases with "make-up" air. This occurs, before the treated trimmings are released from the trim exit system, so that antimicrobial agent does not escape into the work environment.

Embodiments of the present invention may employ various numbers of rotating compartments or may employ compartments replicating these stages in a linear or other format as trim is moved through them, e.g., by conveyor.

The method of the present invention may be employed in various equipment configurations and sizes including, for example, those appropriate for meat packing plants and others who further process trim, such as high volume commercial grinders, retailers, butchers, and commercial kitchens. All sizes of trim can be accommodated. Embodiments of the present invention can be sized for the largest processing facilities or scaled down to treat "bench trim" in a retail setting. In either instance, embodiments of the invention safeguard workers from exposure to airborne antimicrobial.

BRIEF DESCRIPTION OF THE DRAWINGS

Non-limiting and non-exhaustive embodiments are described with reference to the following figures:

FIG. 1 is a side view of the embodiment with the antimicrobial application chamber sloping downward from right to left.

FIG. 2 is a more detailed view of the trim entrance system (i.e., the upper right portion of FIG. 1) in which the trim enters the antimicrobial application chamber through a series of rotating compartments much like a "revolving door." FIG. 2 also shows the gears for rotating the entrance compartments and the conduit for evacuation of antimicrobial from one compartment of the trim entrance device and the introduction of antimicrobial into another compartment of the entrance device.

FIG. 3 is a more detailed view of the trim exit system (i.e., the lower left portion of FIG. 1) in which the trim leaves the antimicrobial application chamber via a second series of revolving compartments. FIG. 3 also shows the gears for rotating the exit compartments and the conduit for evacuation of unused antimicrobial from one of those compartments.

FIG. 4 is a top, i.e., overhead view of the antimicrobial intervention (e.g., application) device. The upper portion of the drawing corresponds to the right-hand (i.e., trim entrance) portion of the device as shown in FIG. 1. The lower portion of the drawing corresponds to the left-hand (i.e., trim exit) portion of the device shown in FIG. 1.

FIG. 5 shows the back of the antimicrobial application device. The left portion of FIG. 5 corresponds to the right portion of the device as illustrated in FIG. 1 and vice versa.

FIG. 6 is an end view of the right-hand portion of the antimicrobial application device as illustrated in FIG. 1.

FIG. 7 is an end view of the left-hand portion of the antimicrobial intervention device as illustrated in FIG. 1.

FIG. 8 is a more detailed, side view of the reservoir for the antimicrobial, associated pump and conduit as shown in the lower right-hand portion of FIG. 1.

FIG. 9 is a more detailed, end view of the antimicrobial recovery system shown in the lower left-portion of FIG. 1.

FIG. 10 is a perspective view of the details of the trim exit system shown in FIG. 1.

FIG. 11 is a perspective view of the trim entrance system shown in FIG. 1.

FIG. 12 is a schematic depicting the flow of antimicrobial through application, recovery and recycling of the devices depicted in FIGS. 1-11. FIG. 12A is a schematic of the trim entrance system, and FIG. 12B is a schematic of the trim exit system.

DETAILED DESCRIPTION OF THE INVENTION

Figure 1:
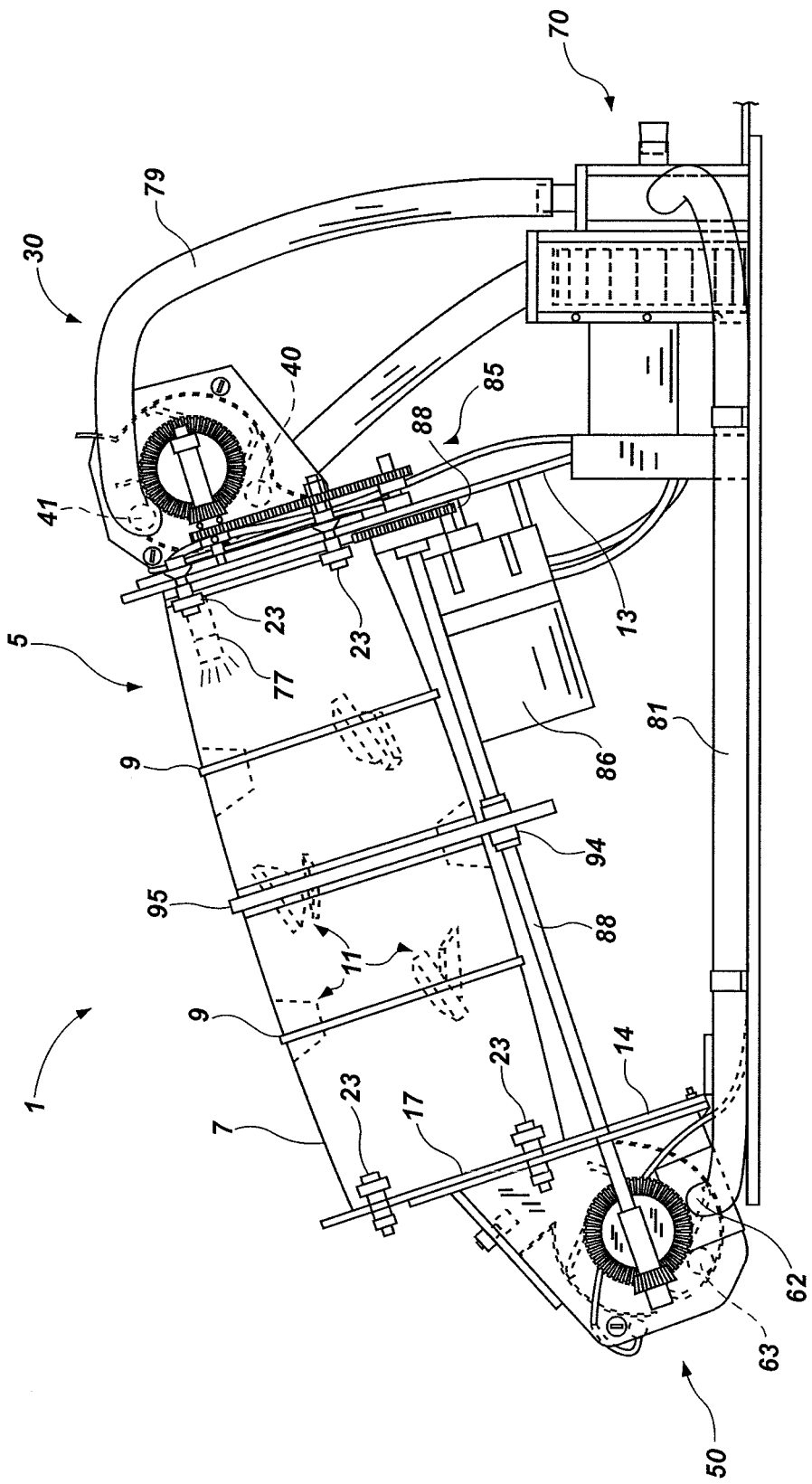
FIGS. 1 through 11 are drawings all representing different views of one embodiment of the invention in solid detail.

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will convey the scope of the invention to those skilled in the art who may implement it. Embodiments may be practiced as methods, systems or devices. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention. These features and advantages of the present invention will become more fully apparent from the following description, drawings and claims, or may be learned by the practice of the invention as set forth hereinafter. The following detailed description is, therefore, not to be taken in a limiting sense.

The invention is applicable to the processing of many different types of animal protein products including, beef, pork, sheep, goats, poultry and fish. In particular, the invention is useful in the processing of animal protein pieces ("trimmings") into composite products, for example, hamburger, sausage, poultry "parts," fish "cakes" and similar items. The preparation of these products frequently involves grinding, comminution, blending and or molding of trimmings into finished products. Because of the volume of hamburger manufactured and processed and sold and the level of concern (by producers, the consuming public and regulators) regarding potential pathogens in hamburger, the description herein is focused on the preparation of that particular animal protein product. However, the concepts are equally applicable to other composite animal protein products and, indeed, to other food products (both protein and non-protein) of a similar nature. One or more embodiments of the invention may be useful in the production of meat products of various types, e.g., finished beef cuts, whole poultry carcasses, etc.

Meat packing plants produce a variety of meat cuts, meat products and by-products. After slaughter, skinning, dismemberment and evisceration, a beef carcass is hung from a trolley which enables the carcass to physically move through a series of treatment steps/stations such as chilling and application of an antimicrobial agent. The carcass is then disassembled into various meat components, such as steaks, roasts and/or short ribs. Other meat cuts can be further treated and processed into edible items, such as, corned beef and beef jerky. The bits and pieces of meat that are "leftover" from these processes are frequently referred to as "trimmings" or "trim." Trim pieces consist of muscle and fat. (In some instances other portions of meat may be incorporated in the trim. In countries outside the United States, e.g., Canada, trim may be blended with offal, e.g., hearts) before grinding. Trim pieces may range in size from approximately one inch to many inches and weigh from a few ounces up to ten pounds. In a typical, large production plant in which several thousand cattle are processed per day, as much as 750,000 pounds of trim are processed daily, i.e., approximately 150 pounds of trimming "per head."

Trim pieces are separated and collected during carcass reduction to primal, sub-primal and finished cuts. Trim is collected at each of these operations and conveyed to a "trim area." Typically the trim pieces are manually sorted for muscle/fat content so that the lean and fatty pieces identified can be separately processed, e.g., ground, minced or otherwise processed, into hamburger, sausage and the like. Prior to or after sorting, the trim pieces are commingled.

Trim pieces have many surfaces that were not exposed on the exterior of the whole carcass and, therefore, were not subjected to antimicrobial treatment of the carcass before disassembly. While the non-treated surfaces of the trimmings should be free of pathogenic contamination, nevertheless, each part of the trimmings has its own history of potential contamination or cross-contamination from various possible sources. Accordingly, there is no assurance that the trimmings will be pathogen-free when they reach the trim area. As the trimmings are commingled prior to, during and after grinding, there is a potential that any pathogens on some trim piece(s) will be spread further with potentially harmful consequences. Due to the commingling process, any potential contamination subsequently identified from consumption of the ground meat (e.g., by unknowing consumption of tainted hamburger) will be difficult to trace effectively to the source, requiring an expensive recall arguably, far out of proportion to the actual scope of the contamination. Thus, contamination on one small piece of trimming can have serious health and economic consequences.

The present invention provides a process for efficiently and effectively minimizing these risks. It is applicable with any approved antimicrobial.

The invention provides an antimicrobial intervention for the production of hamburger and other ground meats by thoroughly treating the exterior of the meat trimmings with an antimicrobial agent. By effectively treating all exterior surfaces, the producer should be suitably confident that the resulting ground meat product is devoid of significant pathogenic contamination. The present invention provides systems and methods to achieve that result, provided that the preceding carcass dress procedures do not result in the unground trim's having a microbial load exceeding any reasonable treatment capability.

Embodiments of the present invention may include the use of a closed or essentially closed environment in which the antimicrobial agent is applied to the meat. Such a system completely prevents or severely restricts the antimicrobial agent from escaping into the work environment in amounts that could create environmental or health concerns, e.g., worker complaints or potential violations of government regulations such as any that may be promulgated, for example, by OSHA, the FDA or EPA. This may allow the antimicrobial agent to be applied under conditions (e.g., concentrations and amounts) that are highly lethal to $E.\ coli$ and other pathogens, but do not raise environmental and/or employee health concerns. In addition the closed environment permits greater control over the conditions, e.g., temperature, at which the antimicrobial is applied. Thus, the antimicrobial agent can be applied at optimum conditions in the enclosure. The use of a closed or essentially closed environment also promotes efficient use of the antimicrobial agent. Among other things, a closed or essentially closed system limits the wasteful venting or escape of the antimicrobial agent and may permit unused agent to be recovered and recycled.

Chlorine dioxide, for example, is known as being a highly effective antimicrobial agent that does not impart any perceptible taste or flavor when applied to food products. Typically, chlorine dioxide is generated on site by the acidification of aqueous sodium chlorite which is sprayed on to the carcasses during processing. Some studies in small beef production plants have demonstrated that chlorine dioxide (also referred to in the trade as "acidified sodium chlorite") may have pathogen kill rates up to 100%. ("Antimicrobial Spray Treatments for Red Meat Carcasses Processed in Very Small Meat Establishments," prepared by the Department of Food Science, the Pennsylvania State University, the Department of Animal Science and Food Technology, Texas Tech University, and the Department of Food Science and Nutrition, Washington State University (Copyright © 2005, The Pennsylvania State University).) Chlorine dioxide has been found useful in attacking various pathogens including $E.\ coli$, $Salmonella$, $Campylobacter$, anthrax, and, in some instances, even prions. Chlorine dioxide can also extend the shelf life of food products. Chlorine dioxide can be generated on site by other means. Recently, an aqueous solution of 3000 ppm chlorine dioxide (i.e., "CDG 3000" manufactured and sold by CDG Environmental, Bethlehem, Pa.) has become commercially available.

The application of chlorine dioxide, however, is restricted by concerns about its effect on the work place environment. Thus, chlorine dioxide's use on whole carcasses is restricted to a very narrow range of operating conditions. Government regulations require that the application not exceed 30 ppm, notwithstanding the fact that ventilation "hoods" or "spray cabinets" are routinely employed to prevent "overspray" of the antimicrobial agent and venting of gaseous chlorine dioxide into the workplace. Complaints from workers have, nevertheless, occurred with the use of chlorine dioxide. Even if the excess chlorine dioxide is not physically harmful, it may be objectionable or irritating to workers and can result in worker inefficiency and unnecessary employee/employer issues. Also, if approved levels of chlorine dioxide are exceeded, it can result in the shutdown of a production line until appropriate levels of chlorine dioxide have been re-established. As a result of these considerations, chlorine dioxide cannot be used at its most effective concentrations. In contrast, embodiments of the present invention enable such use.

In embodiments of the present invention, chlorine dioxide can be applied in high concentration without concern for environmental or workplace issues. But embodiments of the invention may enable the resetting of those limits upward, since environmental or work place considerations are no longer a limiting factor. Thus, subject to regulation, chlorine dioxide could be applied in embodiments of the present invention at any dose lethal to pathogens that does not have an adverse effect on the resulting product, e.g., leaving a residual "salty" flavor.

In one embodiment of the present invention, the chlorine dioxide is applied by spraying as a mist (i.e., chlorine dioxide in aqueous solution) to facilitate efficient contact with the surfaces of the trim. The aqueous solution can be generated on-site as acidified sodium chlorite or it can be a previously prepared solution of chlorine dioxide (e.g., "CDG 3000" identified above). Chlorine dioxide vaporizes at 51° F. However at 52° F. and higher, it remains largely dissolved in the aqueous solution, i.e., much like a carbonated beverage. Chlorine dioxide is a less efficient antimicrobial if applied below 52° F., because it is in liquid form. Because chlorine dioxide is most effective as an antimicrobial at about 104° F., it will normally will be employed at elevated temperatures, i.e., between about 52° F. and about 110-113° F. The chlorine dioxide vapor will generally remain in solution until the upper end of the range, i.e., about 110-113° F. As noted later, in recycling the antimicrobial it may be desirable to bleed off some of the liquid to minimize the risk of adding excessive weight (i.e., "gain") to the trim in violation of current regulations.

Other antimicrobial agents that might otherwise have similar environmental or work place concerns may also be used at optimum "strength" with embodiments of the present invention. For example the use of peracetic acid ("PAA") and other "peracids" (e.g., percarboxylic acid) have also faced environmental and work place issues, since workers may be annoyed by the vented chemical. Similarly, some workers take objection to the presence of gaseous lactic acid, which has been commonly employed as an antimicrobial carcass wash. Although processors employing lactic acid have attempted to mitigate this problem by using larger sized spray droplets, this has not completely avoided the problem of airborne antimicrobial. Other antimicrobial agents have similar limitations.

The use of any antimicrobial agent, however, can be enhanced by embodiments of the present invention. This is in part due to the possibility of using the antimicrobial agent more effectively and efficiently. Antimicrobial agents that might be employed include: chlorine dioxide/acidified sodium chlorite; hypobromous acid (e.g., produced, for example, by activation of aqueous hydrogen bromide manufactured and sold under the designation "HB2TM" by Enviro Tech Chemical Services, Inc., Modesto, Calif.); lactic acid, PAA or other percarboxylic acids. In addition it may be possible to employ "advanced oxidation gases" produced by photohydroionization cell technology, such as hydro peroxides, super oxide ions, ozonide ions, hydroxides and other oxidative gases. Oxidation gases may provide complete coverage of the trim without the need for electrostatic spraying or other techniques required with the application of liquid antimicrobial agents.

Because of its lethality to pathogens and its physical properties (including, for example, its density relative to air), embodiments described herein are particularly useful for the application of gaseous chlorine dioxide.

*E. coli* is the principal microbial pathogen at issue in beef slaughtering and processing facilities, but others may be implicated as well. *Salmonella*, for example, poses a significant risk, particularly if the meat packing plant contains an environment where fecal contamination is common. The same is true of meat packing facilities for other animals, such as pigs and lamb. The antimicrobial agent for a particular application is selected considering the principal pathogens involved. These agents may be used in concentrations exceeding that currently approved in open-air interventions.

The invention, however, will not mitigate the effect of using an antimicrobial agent that in high concentrations imparts an undesirable odor, color or flavor to the final product.

Embodiments of the present invention may also provide features that facilitate application of the antimicrobial agent to all exterior portions of the trimmings. This result may be achieved in one or more ways. For example, the trim pieces may pass through a structure that: (a) is tilted at an angle; (b) rotates, vibrates or has other movement; (c) contains features such as baffles, blades or slots; (d) has moving baffles, blades or slots; and/or (e) permits the free descent or "fall" of trim. Whatever features are selected, they are designed so that alone or in combination they "flip" or toss the trim pieces or otherwise expose all exterior surfaces of the trim pieces to the antimicrobial agent. Also, they co-operate to separate any pieces of unground trim that are adjacent one another as they enter the treatment. In one embodiment, the pieces may drop or fall vertically so that all sides are exposed to the antimicrobial agent for an appropriate period of time. Exposure can occur by directly contacting the antimicrobial agent as a gas or a mist. In other embodiments, exposure of some portions of the trim to the antimicrobial agent may occur by those portions contacting walls or other physical parts of the apparatus which have been previously coated with antimicrobial agent. This indirect method of applying the antimicrobial agent has certain inherent deficiencies, and the preferred method of application is to enable the spraying of antimicrobial agent directly onto all exterior portions of the unground trim.

Examples of equipment and methods for enabling unground trim to be presented for direct contact with the antimicrobial agent are illustrated by the device shown in FIGS. 1-11, and schematically in FIG. 12, and by the structures and methods illustrated in FIGS. 13 through 17 as described herein. These are examples of possible systems for accomplishing this purpose.

FIGS. 1 through 11 are drawings illustrating one form of an apparatus and methods consistent with embodiments of the invention.

Before describing that implementation in detail, it is helpful to refer to the schematic of the system in FIG. 12. FIG. 12 is a simplified version of one embodiment of an antimicrobial intervention system for treating trim. FIG. 12A and FIG. 12B are more detailed schematics of the trim entrance and trim exit systems, respectively.

In general, the antimicrobial intervention device 1 comprises: (a) an antimicrobial application chamber 5; (b) a trim entrance system 30 to facilitate movement of unground trim into the antimicrobial application chamber to begin the treatment and to prevent antimicrobial agent from escaping into the work environment; (c) a trim exit system 50 to facilitate movement of treated unground trim from the antimicrobial application chamber and to prevent antimicrobial from escaping; (d) an antimicrobial reservoir, distribution and recovery system 70; and (e) a mechanical motivation system 85 for causing movement of the antimicrobial application chamber 5, portions of the trim entrance system 30, and portions of the trim exit system 50. As explained in more detail below, trim enters the antimicrobial application chamber through the trim entrance system, is subjected to antimicrobial intervention in the antimicrobial application chamber, and exits that chamber via the trim exit system.

Referring to the schematic in FIG. 12, trim enters the antimicrobial application chamber 205 through the entrance system 230 at the upper right. The trim descends through the antimicrobial intervention chamber and exits through the trim exit system 250. Pieces of trim are shown in the entrance and exit system schematics, i.e., FIGS. 12A and 12B.

Conduits 278, 279, 280 and 281 in FIG. 12 indicate the movement of antimicrobial, in this instance, chlorine dioxide. A fan (not depicted in FIG. 12) moves antimicrobial from reservoir 271 into the trim entrance system via line 278 and port 240 and also into the antimicrobial application chamber through line 280 where it is applied through one or more spray heads, represented simply here as 277. Because chlorine dioxide is heavier than air, it moves with the trim down through the antimicrobial application chamber. As depicted in FIG. 12A, antimicrobial is recovered from the trim entrance system via port 241 and line 279. It is replaced by "make-up" air drawn into the trim entrance system via port 242. Similarly, as depicted in FIG. 12B antimicrobial is recovered from the trim exit system via port 262 and line 281. It is replaced by "make-up" air drawn into the trim exit system via port 263. As depicted in FIG. 12, antimicrobial recovered from the trim entrance and exit systems is returned to the reservoir for recirculation.

FIG. 12A depicts a trim entrance system in which a series of four rotating compartments A, B, C, and D move trim into the main antimicrobial application chamber. The compartments rotate in a clockwise manner. In position A, an open compartment receives trim from the upper right. As the compartments rotate, they move sequentially to position B, in which the compartment is closed. Antimicrobial is introduced into this compartment via port 240. The compartment then rotates to position C which is open. Here, trim is pushed and/or falls into the main antimicrobial intervention system (lower left) through the opening. The compartment then rotates in a clockwise manner to another closed position D. Here unused antimicrobial is evacuated through port 241 while "make-up" air is "sucked" or drawn into the compartment via port 242. Finally the compartment returns to position A where it can receive more untreated trim. Thus, the trim entrance system removes all antimicrobial and adds replacement air before each compartment is opened to accept additional trim.

FIG. 12B depicts the trim exit system which operates in a similar manner. It consists of a set of four rotating compartments E, F, G, and H that pass treated trim from the antimicrobial application chamber for further processing, i.e., grinding. The compartments rotate in a clockwise manner. In position E, a compartment receives treated trim from the antimicrobial application chamber (upper right). As the compartments rotate, they move sequentially to position F, in which the compartment is closed. Antimicrobial is evacuated from this compartment via port 262, and make-up air is drawn into the compartment via port 263. The compartment then rotates to position G, which is open. Here, trim is pushed and/or falls from the compartment (lower left) to a conveyor or other device that will take the trim to further processing, i.e., grinding. Thus prior to the compartment's reaching the open position to "dump" treated trim, residual antimicrobial agent has been removed and replaced as necessary with "make-up" air. The compartment then rotates in a clockwise manner to another closed position H. It then moves to the open, initial position E, where it can receive more treated trim from the antimicrobial application chamber.

Since the compartments of the trim entrance and exit systems rotate, it should be recognized that they are not limited to the seemingly "static" positions illustrated in FIGS. 12, 12A and 12B. For the same reason, the positions of the compartments shown in the various drawings, e.g., FIGS. 1-11 and 12 may vary.

FIGS. 1 through 11 depict one form of implementing the antimicrobial intervention system shown schematically in FIGS. 12, 12A and 12B.

In FIGS. 1 through 11, the antimicrobial application chamber consists of a drum 7 which is rotatably suspended between an upper vertical support 13 and a lower vertical support 14. Ribs 9 of thickened material surround the drum at various places along its length to provide structural stability. Each of the supports 13 and 14 contains four rotatable bearings 23 that position and align the drum and permit rotation of the drum about a theoretical axis running through the center of the drum from end-to-end. The upper support also provides a wall 15 that closes off the right end of the drum 7, except for an opening 19 at the top of the wall that permits entrance of trim into the antimicrobial application chamber. Similarly, the lower support 14 contains a wall 17 that closes off the other end of the drum, except for an opening 20 at the bottom of the wall that permits treated trim to leave the antimicrobial application chamber. Each of wall 15 and wall 17 contains an appropriate gasket 24 that contacts the drum, permits the drum to rotate, but provides a seal preventing leakage of antimicrobial from the application chamber into the work place. One such gasket 14, for example, is depicted as generally sealing the area shown in dashed lines in FIG. 7.

For ease of illustration, the "gasket" depicted in the embodiment of the drawings is an appropriately smooth circular, flat ring of plastic that is tightly secured between the vertical support and the end of the rotating drum. In commercial practice, there are better solutions known to those skilled in the art to seal the end of the drum yet to permit rotation of the drum for longer periods of time without failure and without the need for significant maintenance. For example, the circumference of each end of the drum could contain a "flare" that contacts a cone-shaped end piece mounted on the support. The cone-shaped end piece has a rubber seal that fits over the cone shape to form a seal between the drum flare and the cone shape. At several points around the wall of the cone, there is a sealed bearing mounted so that the load-bearing exterior extended through the cone wall and rubber seal so the seal and bearing makes a flat appearance. As the cone wall pushes against the flare drum, the seal holds in antimicrobial gases, the load of the drum rides on the bearing, and the drum flair rubs against the seal but does not ride on it. When it becomes necessary to take the seal apart for cleaning, the ends are readily slid away from the drum. Other gaskets that would provide a gas impermeable seal, but permit rotation of the drum, would be readily known to those of ordinary skill in that art.

The antimicrobial intervention device 1 depicted in FIGS. 1-11 also contains a mechanical motivation system 85 including motor 86 for rotation of the drum 7 and portions of the trim entrance system 30 and the trim exit system 50. The entrance and exit systems move the trim into and out of the drum under a tight vapor seal. In the embodiments shown in FIGS. 1-11, the motor is mounted under the drum and secured to the upper vertical support 13. The motor has a chain drive 88 that rotates external drive shaft 90 supported by the upper and lower vertical supports. Drive shaft 90 extends parallel to the drum and extending beyond the length of the drum as necessary. The drive shaft rotates in response to the motor. A pulley wheel 94 located on the external drive shaft adjacent at approximately the midpoint on the drum provides a means to drive a belt 96 that tightly surrounds much of the outside of the drum. The motor 86 operating via the chain drive 88 rotates the external drive shaft 90 and the associated pulley wheel 94 and belt 96 thereby causing rotation of the drum. Gear drives and/or chain drives 98 and 99 at the other ends of the external drive shaft cause necessary rotation of portions of the trim entrance system and the trim exit system as described below.

As depicted in FIG. 1, the antimicrobial application chamber 5 is sloped downward from the trim entrance system at the upper right to the trim exit system on the lower left. The rotating drum also contains baffles 11 attached to the inside of the drum. The slope of the drum, its rotation and the action of the baffles, causes the trim entering at the upper right to fall, tumble and, in general, descend down to the exit at the lower left of the drum. The speed of the rotation depends on a number of factors (e.g., size and internal design of the drum, nature of the trimmings, volume of trimmings, and other considerations). More importantly, these features and the speed of rotation all assist to cause the external portions of the meat trimmings to be exposed to the antimicrobial environment inside the drum especially the direct application of antimicrobial spray.

Untreated, unground trim enters the antimicrobial application chamber 5 via the trim entrance system 30. In general, the trim entrance system utilizes a multi-chambered "revolving door" system to motivate the trim into the application chamber and to assist in preventing antimicrobial from escape into the work place.

As depicted in FIG. 1, the trim application system is mounted to the outside of the upper vertical support on the other side of the opening 19. As shown in the back, side view of the device, i.e., FIG. 5 and the corresponding perspective close-up, i.e., FIG. 11, the trim entrance system comprises a "revolving door" structure which rotates about horizontal axis 31. Four compartments A, B, C and D of the revolving door structure are defined, i.e., separated, by dividers 32, 33, 34, and 35. The ends of the four compartments are sealed off by walls 36 and 37. The outer circumference formed by the four chambers is sealed by curved outer wall segments 38 and 39. Curved segments 38 and 39 do not touch one another. There is an opening between these segments through which trim can pass from the revolving door into the antimicrobial intervention chamber. All of the components fit snuggly so that there is no leakage of vapor or mist. The ends of the revolving doors may have appropriate gaskets, e.g., "wipes," (not depicted) to further serve this purpose.

The number of chambers in the "revolving door" is not important. But four is a preferred number because there are four stages of operation as the "revolving doors" rotate.

Figure 11:
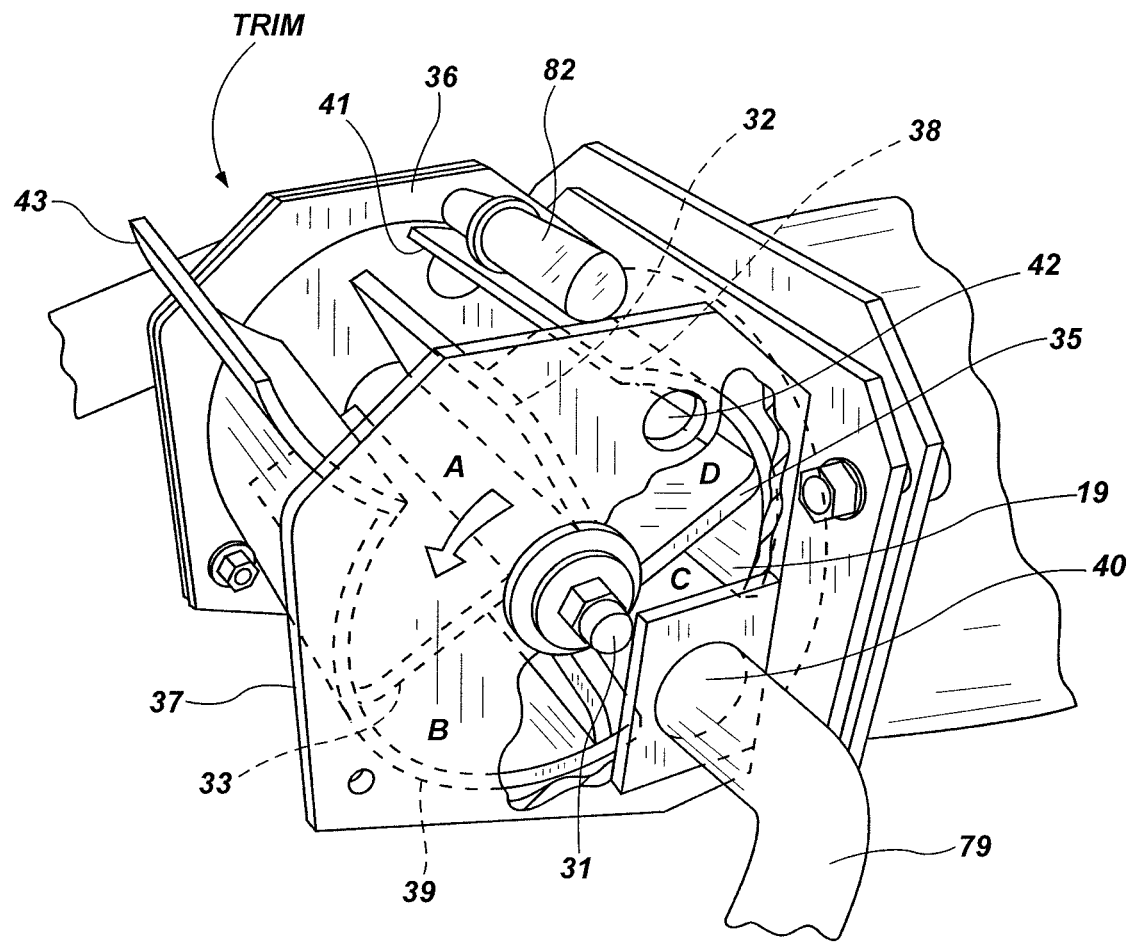
Figure 13:
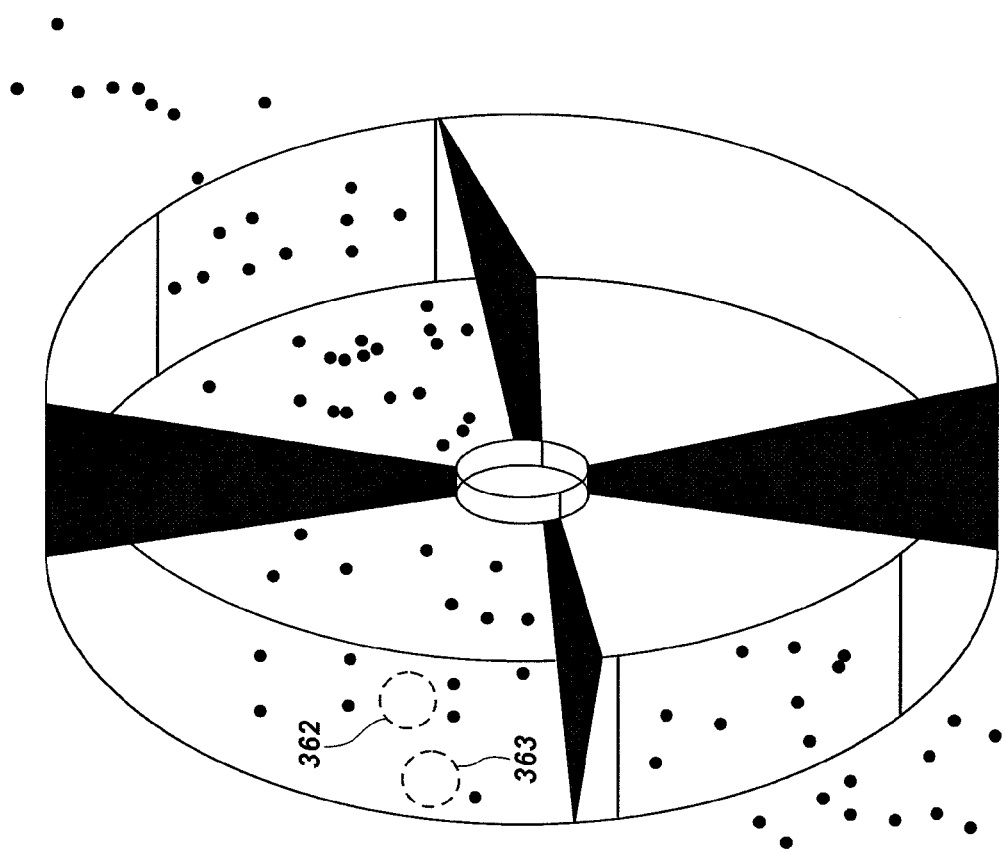
FIG. 13 is a schematic showing an alternative configuration for the ports in the exit system for the trim from the antimicrobial application chamber.
Figure 13:
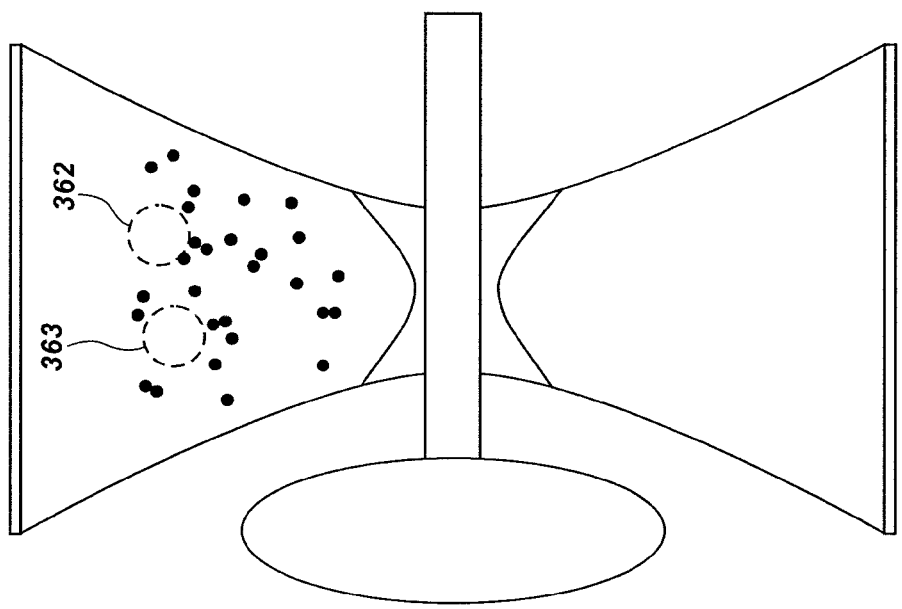

The compartments A, B, C, and D are rotated about the axis 31 in a counter-clockwise manner using FIG. 11 as a frame of reference. Since FIG. 11 is the back of the trim intervention system, motion is in a counter-clockwise direction as opposed to the clockwise movement when viewed from the front of the system as depicted schematically in FIG. 13. The movement is the same; it is a matter of the vantage point.

Figure 2:
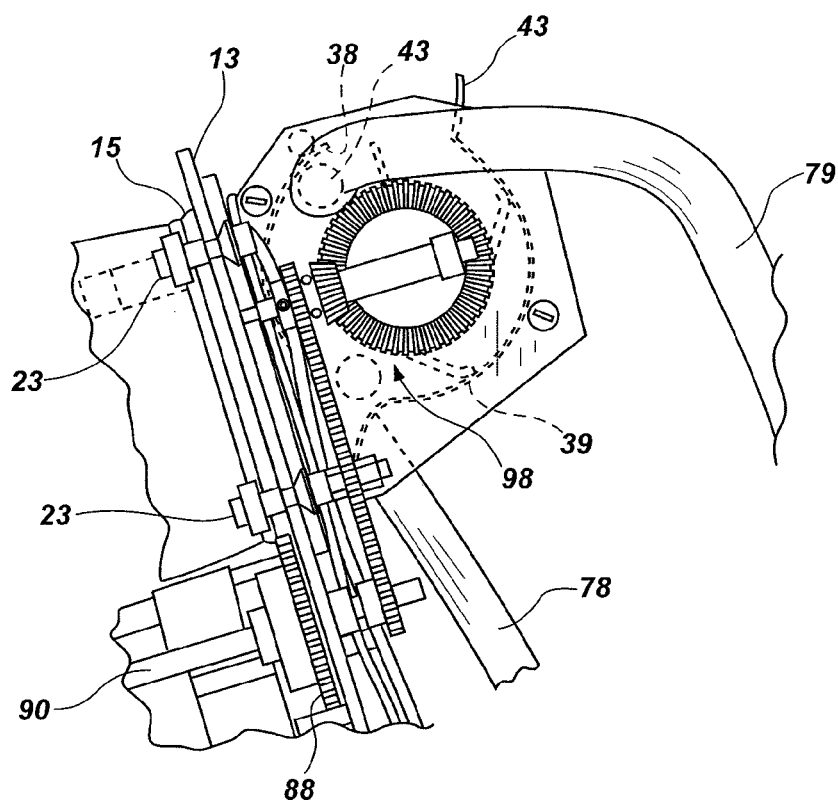

FIGS. 1 and 2, illustrate how this can be accomplished, for example, via external drive shaft 90 which moves a chain drive and gears—all designated as 98. Through these intermediate structures, motor 86 is able to rotate the compartments in the "revolving door" about the horizontal axis 31. The drive mechanisms are selected so that a full rotation through all four stages occurs in a time frame that provides a continuous flow of trim into the antimicrobial intervention chamber and otherwise enables the objects of the invention to be achieved. All of this must take into account the quantity of the trim to be processed, the size of the compartments, the size of the antimicrobial intervention chamber, and the desired application rate of the antimicrobial agent.

Figure 5:
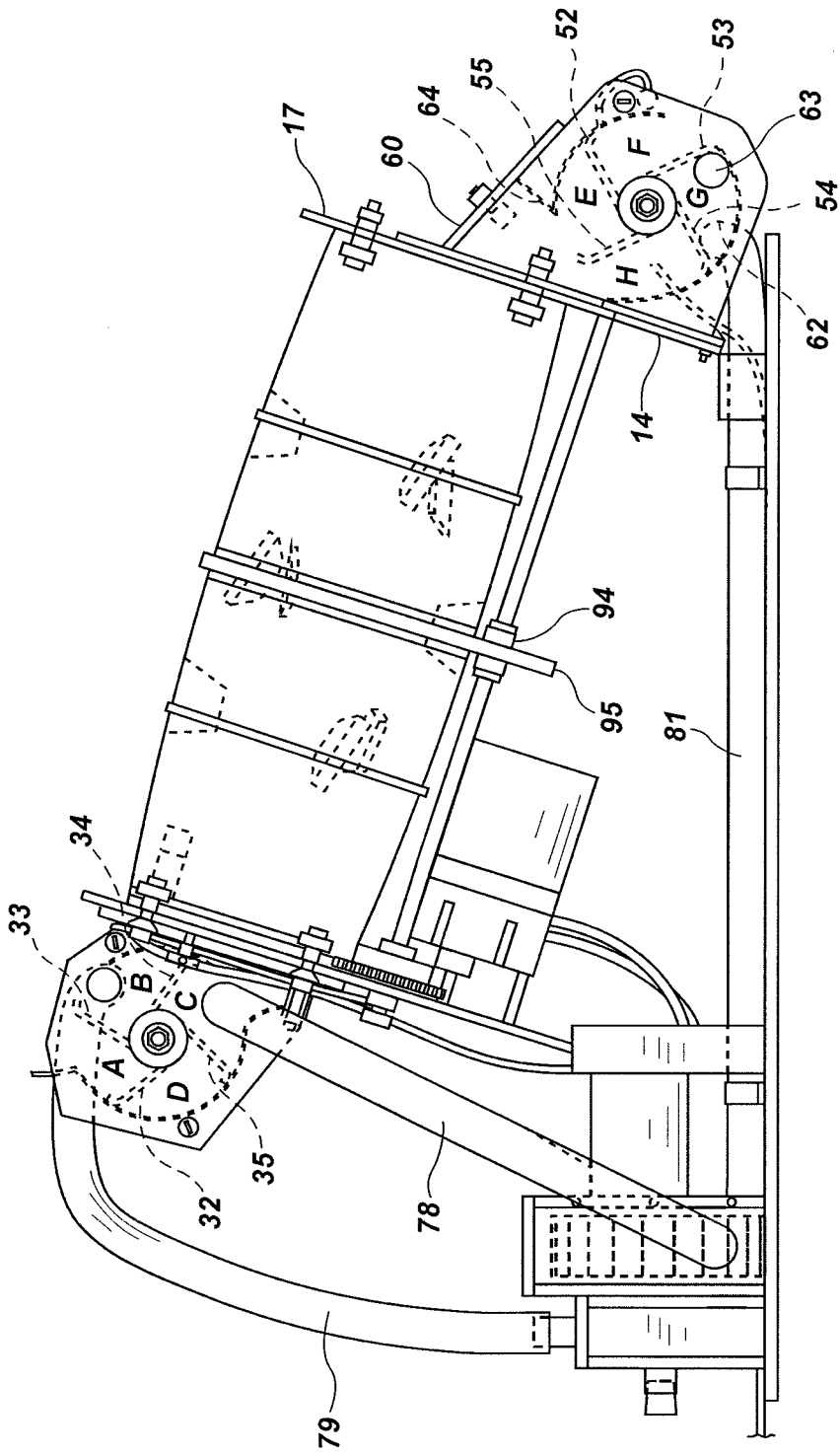
Figure 6:
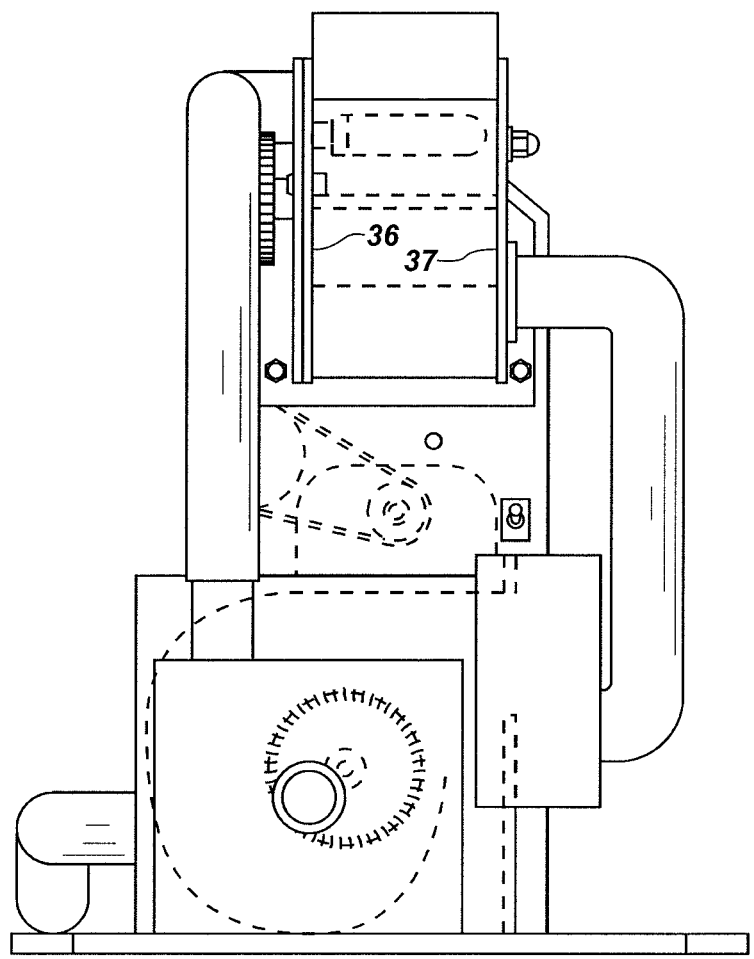
Figure 7:
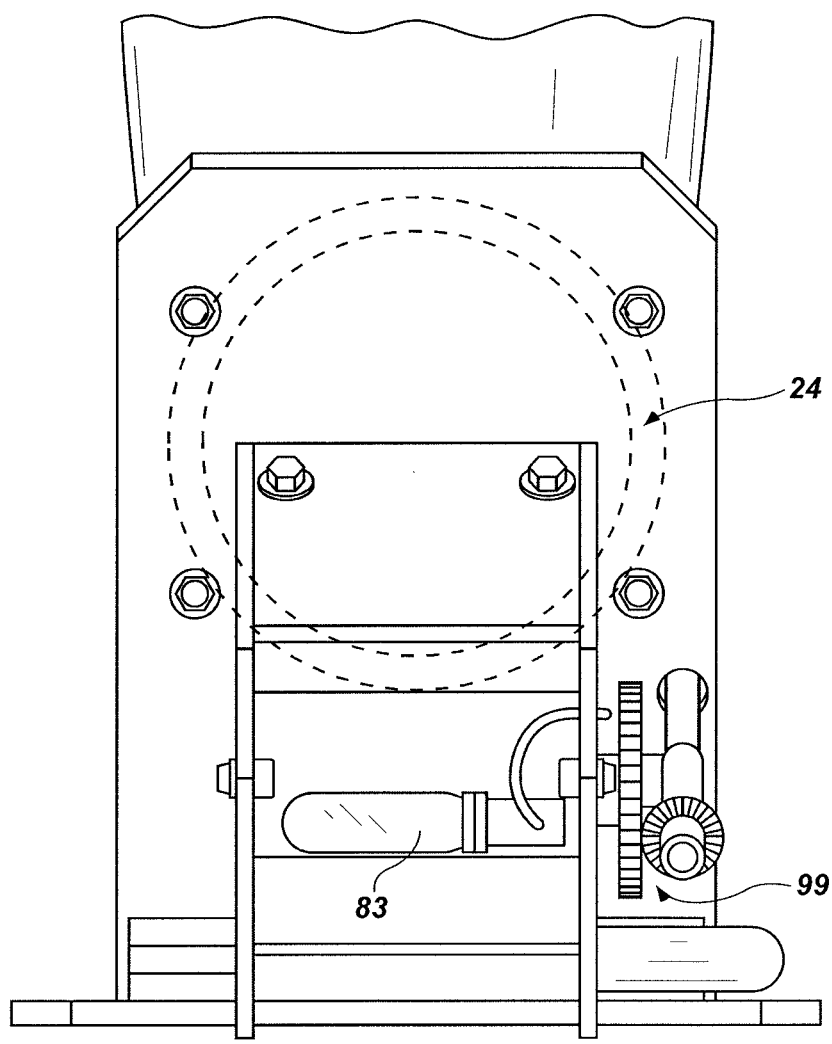
Figure 8:
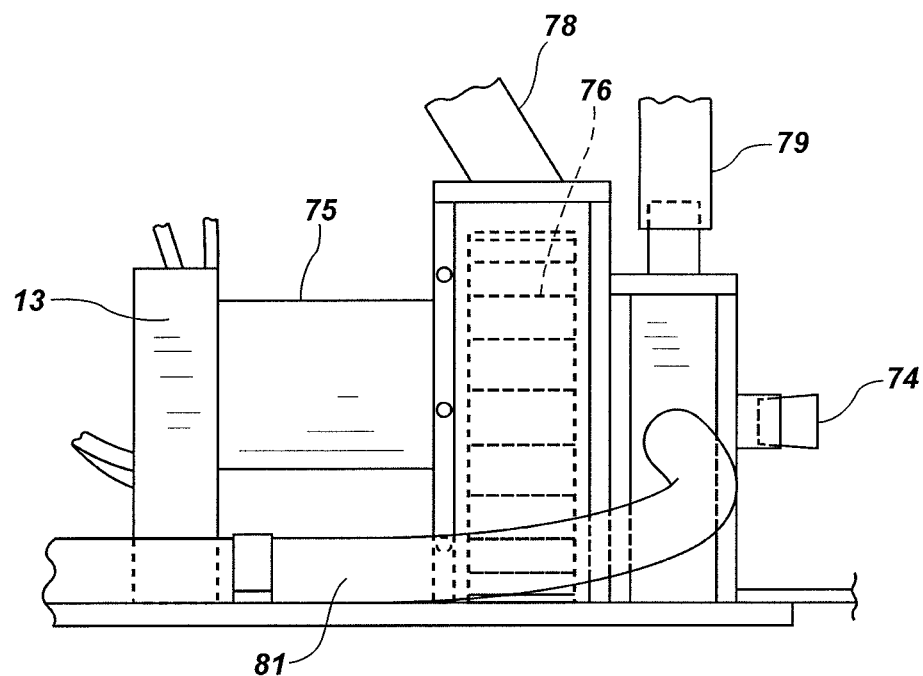
Figure 9:
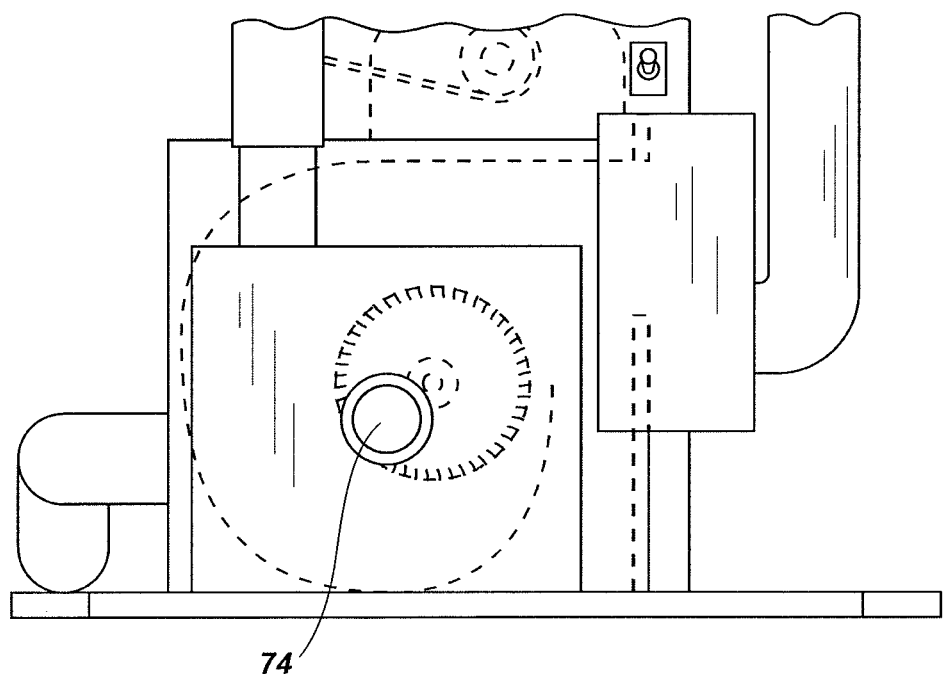

Operation of the trim entrance system is best understood with reference to FIGS. 5 and 11. If the device is used in a commercial meat packing plant, the trim is collected from various dressing stations and is transported to the antimicrobial intervention device by conveyor or other means. Taking into account the throughput factors mentioned above, the trim is fed at an appropriate rate into the trim entrance system as indicated on FIG. 11. Trim is directed by deflector 43 into compartment A of the "revolving door."

As the compartments rotate in a counter-clockwise manner, the trim is pulled downward by gravity against the outer wall segment. In this position, i.e., that of compartment B in FIGS. 11 and 12, the compartment is totally bounded by its dividers, by end walls 36 and 37, and by the outer wall segment. This compartment is also significant because it contains means for the injection of antimicrobial agent onto the trim. The antimicrobial agent is introduced via conduit 78 and a corresponding port 40 in one of the sidewalls.

As the "revolving door" continues to rotate in a counter-clockwise manner, it moves to the position indicated by compartment C. In this position, the compartment is bounded by the dividers, by the end walls 36 and 36. However, the circumference of the chamber lies between the outer wall segments 38 and 39. This enables trim to fall downward from compartment C through the opening and through the opening 19 in the upper end support and into the antimicrobial intervention chamber. Antimicrobial agent that has been introduced into the compartment contacts the trim and moves with the trim as it descends into the antimicrobial intervention chamber.

As the "revolving door" continues to rotate in a counter-clockwise manner, it moves to the position indicated by compartment D. In this position, i.e., that of compartment D in FIG. 12, the compartment is totally bounded by its dividers, by end walls 38 and 39, and the outer wall segment. This compartment is between: (1) the position in which antimicrobial has just been injected and trim has been "dumped" into the antimicrobial intervention chamber and (2) the position in which it will be open to receive more trim. Compartment D is significant, because the antimicrobial agent is removed through port 41 and conduit 79. Conduit 79 is attached to the suction side of the fan 76 which moves antimicrobial through the system. The force of the fan should be sufficiently strong so that it completely removes the vapor contained in chamber D during the time interval that the chamber is located adjacent the hole. Compartment D, also contains port 42 in one of the sidewalls for the introduction of "make-up" air as the residual antimicrobial is being evacuated.

Finally, the revolving door moves to the initial position A. Prior to entering this position where it can receive more trim, residual antimicrobial is removed so that it is not released to the workplace.

Trim that has been subjected to the antimicrobial intervention leaves the antimicrobial application chamber 5 via the trim exit system 50. Like the trim entrance system, the trim exit system also utilizes a multi-chambered revolving door system in this instance to motivate the treated trim out from the intervention chamber and to assist in preventing antimicrobial from escaping the application chamber into the work place. As depicted in FIGS. 1, 3, 5 and 10, the trim application system is mounted to the outside of the lower vertical support on the other side of the opening 20. As shown in the back side view of the device, i.e., FIG. 5 and the corresponding perspective close-up, i.e., FIG. 10, the trim exit system comprises a revolving door structure which rotates about horizontal axis 51. Four compartments E, F, G and H of the revolving door structure are defined (i.e., separated) by dividers 52, 53, 54, and 55. The ends of the four compartments are sealed off by walls 56 and 57. The outer circumference formed by the four chambers is sealed by curved outer wall segments 58 and 59. Segments 58 and 59 do not touch one another. There is an opening between these segments through which trim can pass from the antimicrobial intervention chamber into the revolving door E. Canopy 60 and walls 56 and 57 form a "chute" to help guide the treated trim from the antimicrobial application chamber through the exit opening 20 in the lower vertical support and into compartment E of the trim exit system. A deflector extending down from the canopy also helps guide the treated trim into the compartment.

Figure 3:
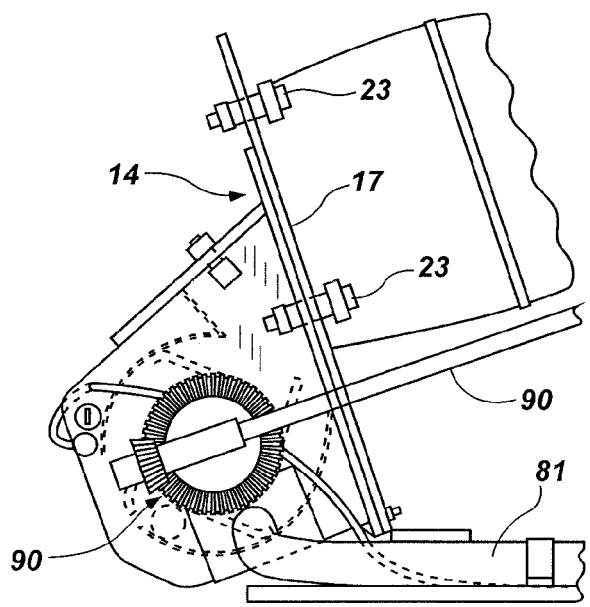
Figure 4:
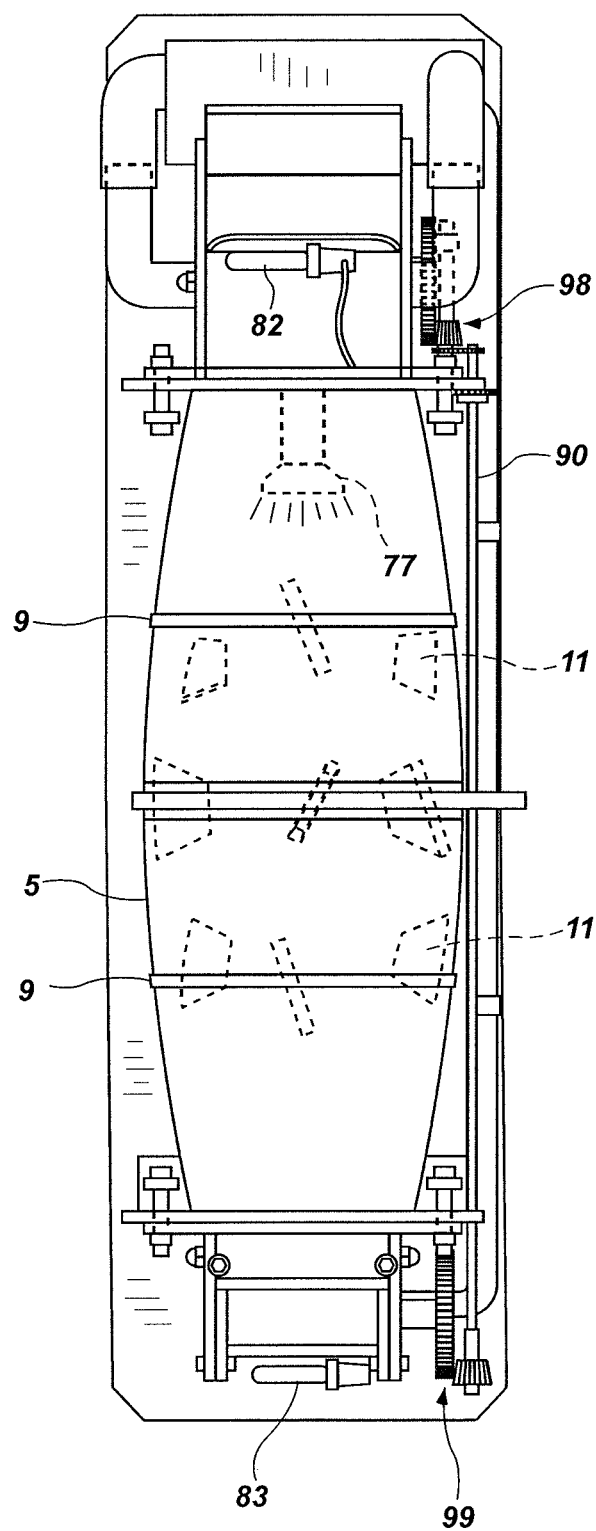
Figure 10:
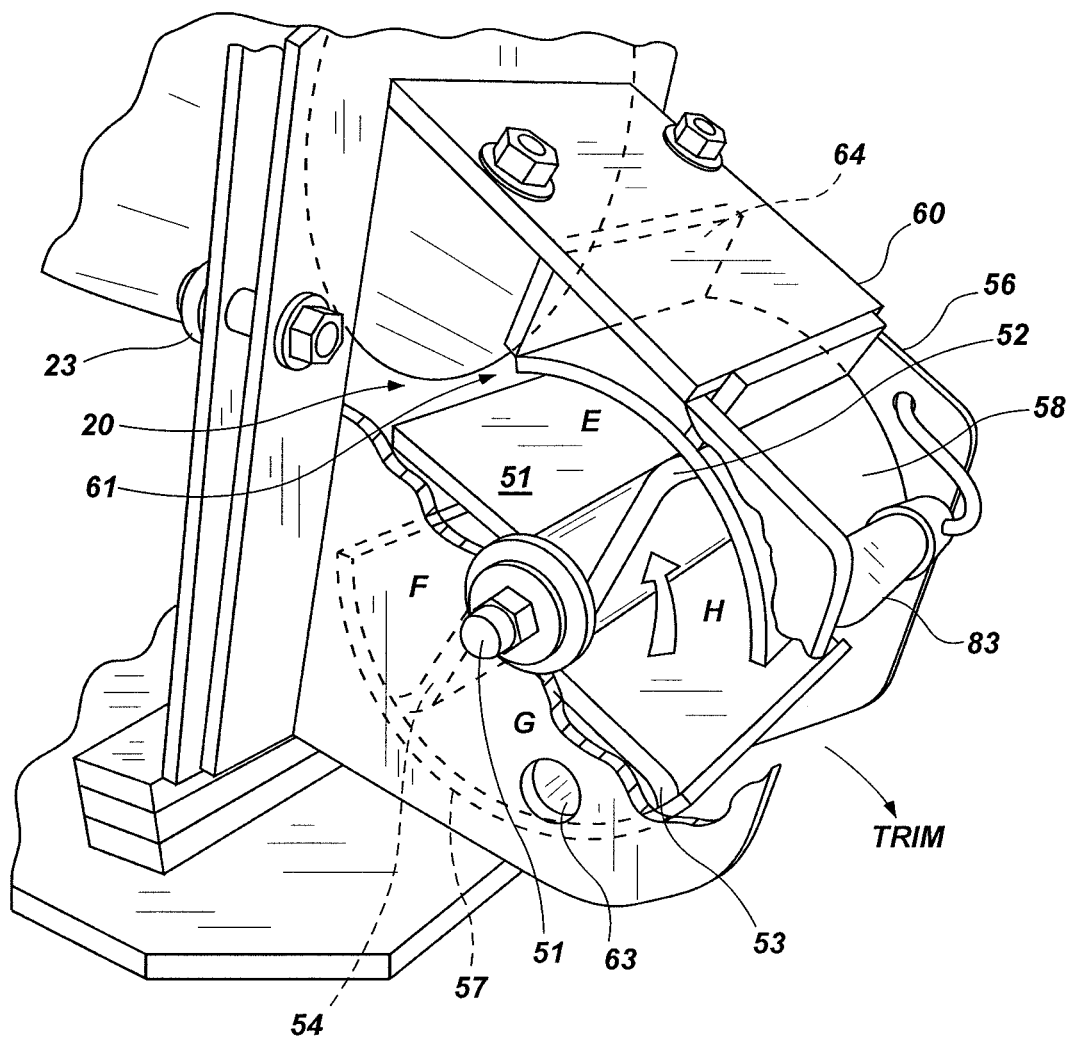

The compartments E, F, G, and H are rotated about the axis 51 in a counter-clockwise manner using FIG. 10 as a frame of reference. As shown in FIGS. 1 and 3, this is accomplished via external drive shaft 90 and gears 99 that rotate the axis of the "revolving door." Through these intermediate structures, motor 86 is able to rotate the compartments in the "revolving door." The drive mechanisms are selected so that full rotation occurs in a time frame that provides an adequate flow of trim from the antimicrobial intervention chamber and otherwise enables the objects of the invention to be achieved. All of this must take into account the quantity of the trim being processed, the size of the antimicrobial intervention chamber, and the desired application rate of the antimicrobial agent.

Operation of the trim exit system is best understood with reference to FIGS. 5 and 10. As the antimicrobial intervention is completed, treated trim at the lower portion of the intervention chamber needs to be removed without venting unused antimicrobial agent to the work place. Treated trim leaves the antimicrobial intervention chamber through opening 20 in the lower vertical support.

The trim first enters compartment E of the "revolving door." In this position, i.e., that of chamber E in FIG. 11, the compartment is totally bounded by its dividers by end walls 56 and 57, by canopy 60 and the outer wall segment 58 at the base of the canopy. This prevents the antimicrobial agent from escaping as the treated trim leaving the antimicrobial intervention chamber enters this compartment.

As the "revolving door" continues to rotate in a counter-clockwise manner, it moves to the position indicated by chamber F. In this position, the compartment is bounded by its dividers, by end walls 56 and 57, and by the outer wall segment 58. This closed compartment is significant because it contains means for the removal of the residual antimicrobial agent. This is accomplished by evacuation through port 62 and conduit 81. Conduit 81 is attached to the suction side of the fan 76, which moves antimicrobial through the system. The force of the fan should be sufficiently strong so that it completely removes the vapor contained in chamber F during the time interval that the chamber is located adjacent the hole.

Next, the revolving door moves to position G. In this position, the chamber is bounded by its dividers, by end walls 56 and 57 but is in between the outer wall segments. Treated trim is motivated by the rotation of the divider and the force of gravity and is directed by the outer wall segment to exit the antimicrobial intervention device. One of the outer wall segments has a port 63 through which "make-up" air is introduced as unused antimicrobial is being evacuated.

Next, the revolving door moves to position H. In this position, the chamber is again totally bounded its dividers, by end walls 56 and 57, and by an outer wall segment.

Finally, the revolving door moves to the initial position E where it receives treated trim from the antimicrobial intervention chamber.

After the treated trim leaves the trim exit system it is transported via a conveyor belt or otherwise systems known in the art for grinding the trim into hamburger, sizing/forming it (if necessary) and packaging for distribution. The treated trim may also be packaged in that form and delivered to "post processors" who make various products, e.g., "ready-to-eat" items, for sale.

The antimicrobial intervention device also includes an antimicrobial reservoir, distribution and recovery system 70 for moving the antimicrobial agent to the point(s) of application and recovering it for potential reuse. FIG. 12 is a simplified diagram showing a schematic overview of the movement of antimicrobial agent. In this case, the antimicrobial agent may be chlorine dioxide vapor which is heavier than air. Antimicrobial agent from the reservoir and fan combination 71 is forced into compartment B of the trim entrance system and though nozzle 77 in the antimicrobial application chamber 5. The chlorine dioxide descends with the trim in the chamber. The vacuum side of the fan recovers unused chlorine dioxide from compartment F of the trim exit system and returns it to the reservoir. Similarly, unused antimicrobial agent is recovered by the suction side of the fan from compartment D in the trim entrance system and is also returned to the antimicrobial agent reservoir.

When an antimicrobial that includes liquid or a liquid component is employed, the antimicrobial distribution and recovery system should include means to remove excess liquid. Under current regulations, any antimicrobial intervention applied to trimmings is not allowed to add more than 0.5% to the weight of the meat (i.e., "weight gain"), and the intervention must result in a measurable microbiological reduction. It is more difficult to meet the first of these requirements where the antimicrobial contains liquid that can be absorbed by the trim thereby causing a significant weight gain. In addition, where the antimicrobial comprises a liquid, it may be susceptible to entrapping and/or absorbing small meat particles and/or materials that might contaminate the antimicrobial and make its re-use undesirable. To mitigate these possibilities it may be desirable to "bleed off" or otherwise remove some or all of the antimicrobial liquid at one or more points in the antimicrobial distribution and recovery system. For example, line 81 which returns unused antimicrobial from the exit system to the reservoir 71 may contain a "tap" (not shown) that permits the removal of sufficient liquid so that problems of weight gain and/or contamination are avoided. Such a tap can also be used to remove any liquids that might emanate from the trim during the antimicrobial intervention and become inadvertently included within the antimicrobial return line 81.

FIGS. 1-11 show one embodiment of an antimicrobial storage, distribution and re-cycle system 70. Antimicrobial agent is contained in a reservoir 71, which is depicted as a box. Outside the box is motor 75 which drives a shaft extending inside the reservoir and rotates fan 76. The fan blades are relatively contiguous with the sides of the reservoir thereby permitting antimicrobial agent to flow either out of the reservoir in a direction motivated by the fan blades or to be drawn into the reservoir from outside on the intake side of the fan. The axis of the fan is also concentric with an opening 74 in the reservoir through which antimicrobial agent is drawn into the reservoir. Thus, the output of antimicrobial agent from the reservoir for intervention purposes equals the return of unused antimicrobial plus necessary make-up.

For intervention purposes, fan 76 drives antimicrobial agent through conduit 78 and port 40 into compartment B of the trim entrance system as previously described. Antimicrobial is also fed to one or more spray heads 77 located appropriately inside the treatment chamber 5 via conduit 280 as identified on FIG. 12. The majority of this antimicrobial agent enters the intervention chamber along with the trim. This movement of the antimicrobial agent is encouraged by the rotation of the trim exit system and the fact that suction is applied at the trim exit. In one embodiment, the antimicrobial intervention chamber is operated at a slight negative pressure to encourage this movement. As previously described conduit 79 pulls antimicrobial agent that does not enter the intervention chamber from compartment D in the trim entrance system as that portion of the "revolving door" moves to that position. Conduit 81 pulls unused antimicrobial agent from compartment F in the trim exit system as previously noted. Thus, the trim entrance system and the trim exit system both serve to recover unused antimicrobial agent before it can be vented to the work area.

In embodiments of the present invention, the rotation of the compartments in the trim entrance system should be coordinated, i.e., synchronized, with the rotation of the compartments in the trim exit system. As the leading edge of the compartment in the trim entrance system passes the antimicrobial intake port and opens into the main antimicrobial application chamber, the leading edge of the compartment in the trim exit system containing treated trim should be passing the trim evacuation port at the same time. This allows the free flow of antimicrobial from the upper inlet port in the trim entrance system, through the main application chamber, to the lower evacuation port momentarily, thereby sustaining the movement of antimicrobial. The ports in the trim entrance system and the trim exit system should also be located appropriately to facilitate this process.

As depicted in FIGS. 12A and 12B and in FIGS. 1-11, the ports for entrance and recovery of antimicrobial agent and for allowing make-up air on the trim entrance system and the trim exit system are located on the flat surfaces that close of the sides of the rotating compartments. In another embodiment of the invention, these ports can be located on the non-rotating, i.e., fixed, circumferential segments as shown schematically in FIG. 13. This figure shows a trim exit system 350, in which the port 362 for evacuating unused antimicrobial and port 363 for enabling the introduction of "make-up" air are located on the curved, fixed outer wall segments of the trim exit system.

Secondary precautions may also be taken to prevent the venting of antimicrobial agent outside the antimicrobial intervention device. For example, where chlorine dioxide gas is used as the antimicrobial agent, ultraviolet light 82 located in connection with the trim entrance system and ultraviolet light 83 located in connection with the trim exit system may be employed to "de-activate" any chlorine dioxide that might happen to escape. (See FIG. 4.) Generally, decomposition of chlorine dioxide occurs at UV wavelengths shorter than 3753 Å. Similarly, supplemental exhaust "hoods" located at the trim entrance system and the trim exit system can capture any antimicrobial agent that might inadvertently escape at these locations.

The antimicrobial intervention system depicted in FIGS. 1-11 injects antimicrobial agent onto the trim in the compartment B of the trim entrance device as the trim enters the intervention chamber and, again, inside the intervention chamber 5. Spraying can occur at one or more locations inside the chamber at locations and in directions that facilitate application of the antimicrobial agent to all exterior surfaces of the trim. The rotation of the drum, its slope and baffles are all operated in a manner, so that the trim is flipped, tumbled or otherwise exposed so that the antimicrobial agent can directly contact the exterior surfaces. The design (size of the drum, number, configuration and location of baffles) and operation of the chamber (e.g., speed of rotation) can be determined by one skilled in the art for a particular application (e.g., quantity, condition (temperature and moisture content) and size range of trim being treated. The desired result is that all exterior surfaces of the trim are exposed to direct contact with the antimicrobial agent. Application of the antimicrobial agent to the trim may also be facilitated by the use of electrostatic spraying. This enables the exterior portions of the trim to be directly contacted with the antimicrobial agent, even though those portions may be facing away from the direction of the spray. Thus, the use of an electrostatic spray may "leverage" the effect of a given quantity of antimicrobial in contacting all portions of the trim.

The embodiment shown in FIGS. 1-11 is arranged so that the trim descends as antimicrobial is applied. In another embodiment, the trim may move upward in the antimicrobial application chamber. This can be accomplished by having the baffles configured in a manner that moves the trim upward. With slight modifications the in feed and output drum closures would function in the same way, except the in feed would be located above the lower end of the chamber and the output closure would be below the upper end of the application chamber. The advantage of having the trim move in this manner would be that the pieces of trim may be more likely to separate completely from one another.

Figure 14:
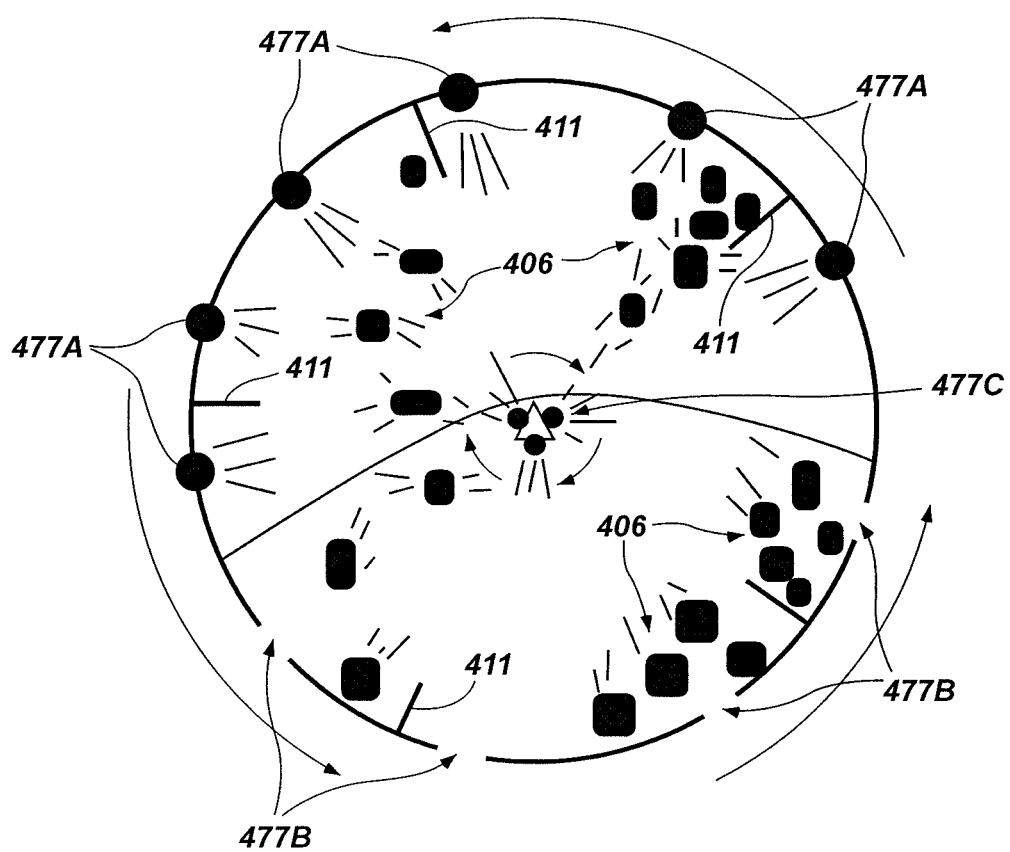
FIG. 14 is a schematic illustration of a cross-section of a rotating antimicrobial application chamber. It illustrates one embodiment of applying, e.g., spraying, trim inside a rotating drum employing nozzles mounted inside the wall of the drum and in the center of the drum.

FIG. 14 is a schematic showing one form of applying, e.g., spraying, trim inside a rotating drum employing nozzles mounted inside the wall of the drum and in the center of the drum. The schematic shows a cross section of the application chamber 405 rotating in a counter-clockwise direction and including internal baffles 411 for tumbling and lifting the trim 406. The drum has nozzles 477A and 477B located on the insider periphery of the drum and a series of nozzles 477C along the center axis of the drum. Antimicrobial agent is fed to the nozzles through conduits not depicted. Trim pieces 406 are contacted on all sides by tumbling action that exposes them to antimicrobial agent directed from the nozzles. As the drum rotates, nozzles 477B located along the bottom portion of the drum are covered by descending trim pieces and are not as effective in directing antimicrobial agent for contact with the trim. Depending on the quantity of trim, nozzles 477B may be relatively ineffective making it desirable to de-couple them from the antimicrobial conduit or otherwise inactivated temporarily. They can be re-coupled or re-activated when they move upward into the positions of nozzles 277A.

In certain embodiments of the invention it may be desirable to arrange the antimicrobial intervention chamber in a generally vertical direction. This facilitates getting the trim "airborne" so that all surfaces can be sprayed.

Figure 15:
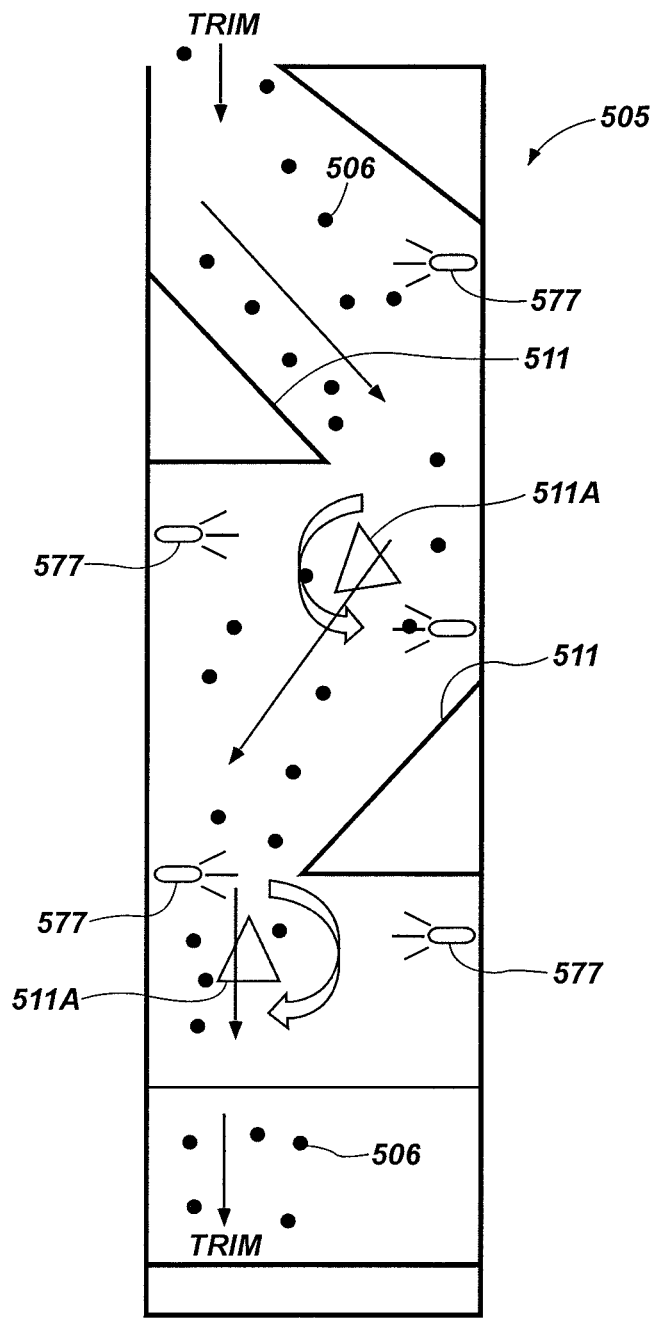
FIG. 15 is a drawing of an alternative form of antimicrobial application chamber comprising a vertical chamber through which trim can descend and be positioned, i.e., "suspended," for spraying.

FIG. 15 is a schematic showing one such form of antimicrobial application chamber comprising a vertical chamber 505 through which trim can descend. The trim 506 impacts a series of baffles or slides 511 and rotatable triangles 511A so that the trim pieces are separated and become temporarily airborne to facilitate having all surfaces of the trim available for contact with the antimicrobial spray. Spray nozzles 577 are located on the back and sides of the chamber between the baffles where the trim is suspended, i.e., not in contact with any surface of the chamber or a baffle, and highly susceptible to full spraying. Such a device would be used in connection with a trim entrance system and a trim exit system (not depicted) as previously described. Any combination of slides, triangles, wheels or other features could be employed to assist in separating the trim pieces and causing them to be airborne.

Figure 16:
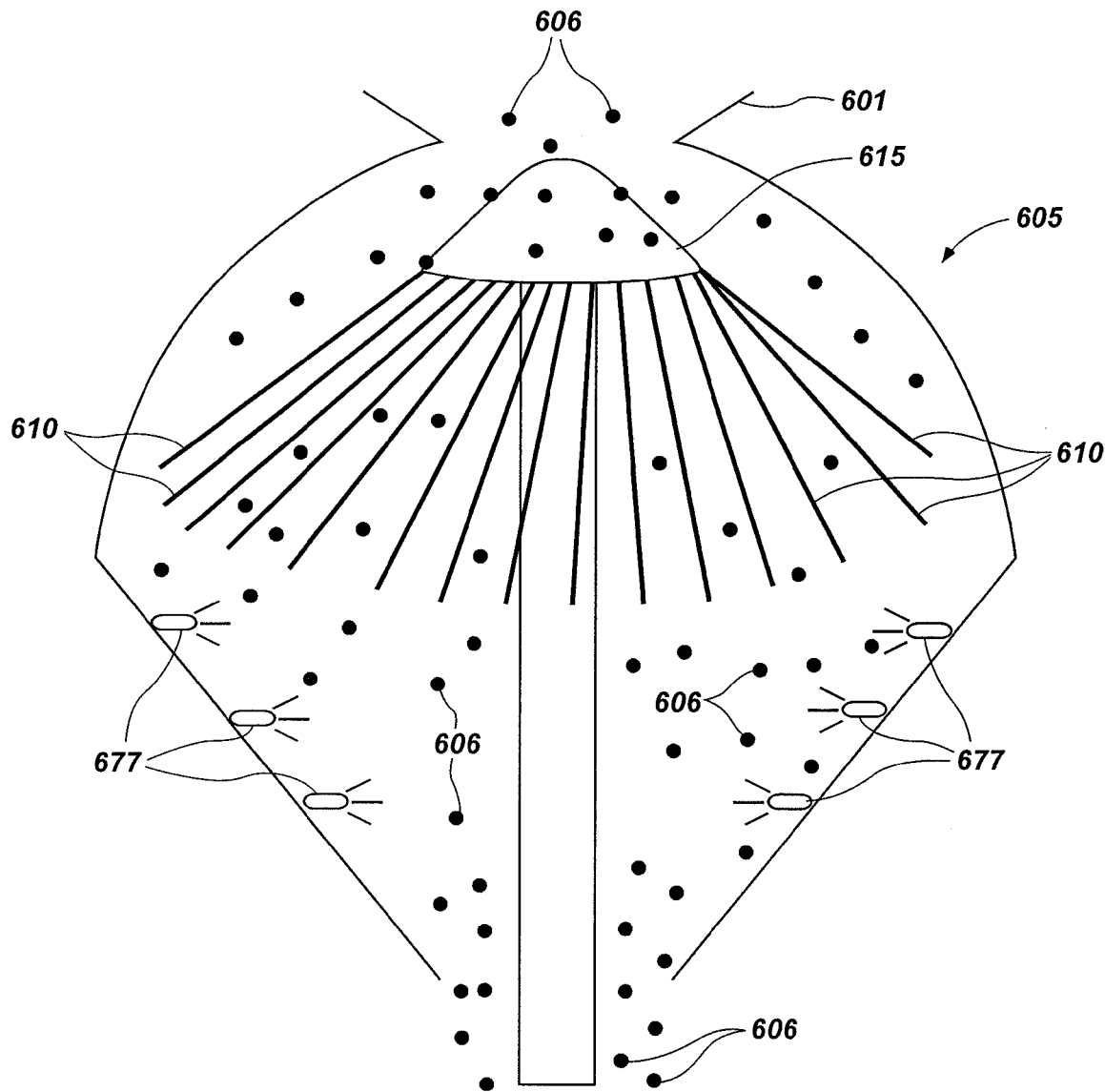
FIG. 16 is a graphic illustrating an alternative form of positioning or suspending trim for antimicrobial intervention using a rotating array of baffles mounted at the entrance of the trim into the antimicrobial application chamber.

FIG. 16 is a graphic illustrating an alternative form of positioning or suspending trim for antimicrobial intervention using a rotating array of baffles mounted at the entrance of the trim into an essentially vertical intervention chamber. Trim enters the chamber 605 at the top via inlet 601 from a trim entrance system (not shown). As trim enters the chamber it is contacted by a series of blades 610 rotating about a hub 614. Again, the blades are intended to separate any trim pieces that might be stuck together so that all sides of each trim piece are available for contact with spray nozzles 677 as the pieces descend through the chamber. The treated trim is collected together via the conical shaped lower portion of the chamber and is removed with a trim exit system (not shown).

Figure 17:
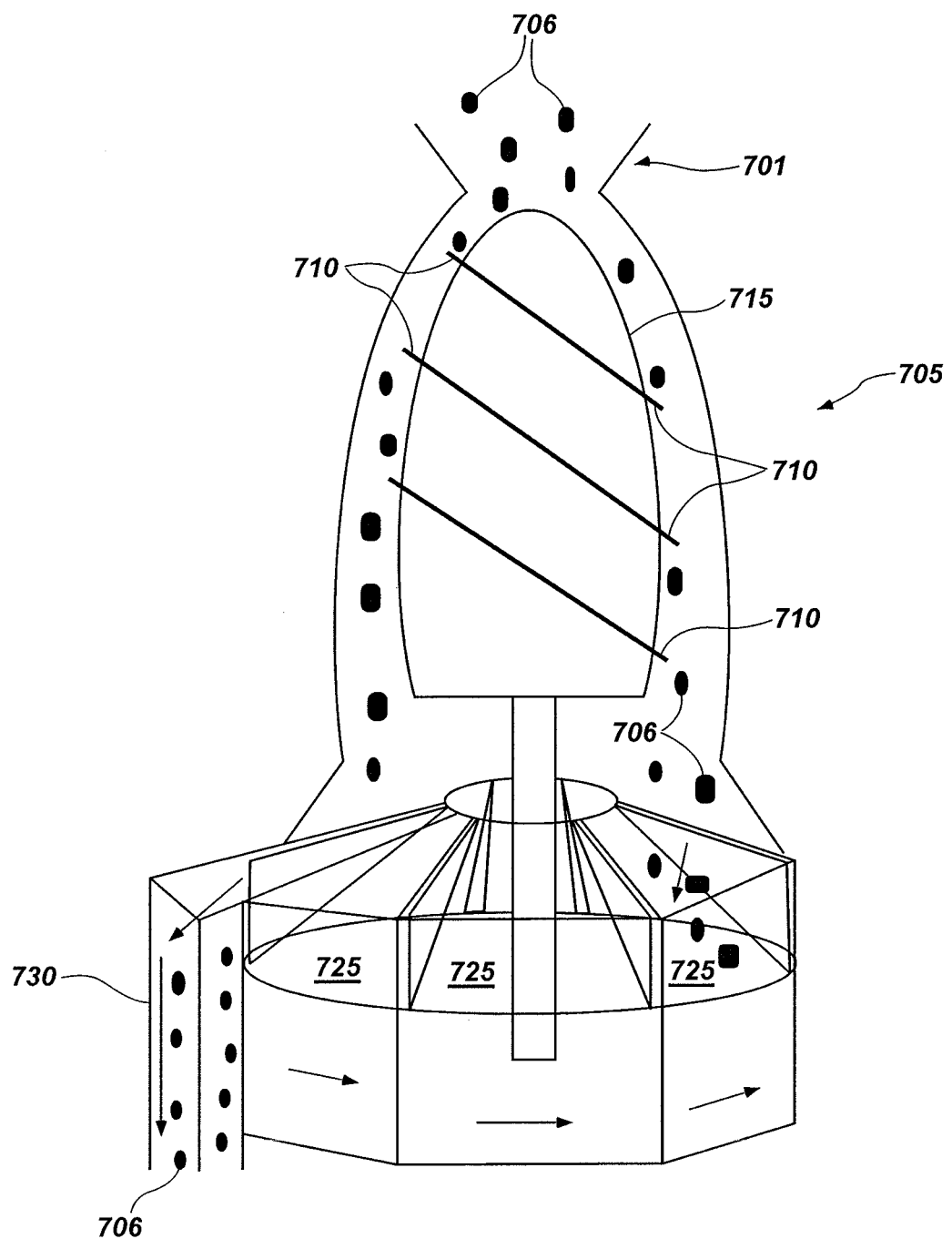
FIG. 17 is a schematic representing another alternative form of positioning or suspending trim for antimicrobial intervention in which a rotating hub with external baffles is mounted inside an antimicrobial application chamber.

FIG. 17 is a schematic representing another alternative form of positioning or suspending trim for antimicrobial intervention in which a rotating hub with baffles is mounted inside the intervention chamber. Trim 706 enters the chamber 705 at the top via 701 from a trim entrance system (not shown). As trim enters the chamber it is contacted by a rotating hub 715. The hub may have protrusions illustrated in this case as tapered, i.e., spiral, baffles 710 which serve to separate any pieces of trim that are stuck together and to kick them outward where they are suspended in the air. The trim pieces are subjected to spraying as they descend through the chamber from nozzles (not shown) located on the inside of the chamber or on the rotating hub. Again, the blades are intended to separate any trim pieces that might be stuck together so that all sides of each trim piece are available for contact with antimicrobial emanating from the spray nozzles as the pieces descend through the chamber.

FIG. 17 also illustrates an alternative form of collecting treated trim in the bottom of the chamber. In this case a series of concentric, slanted chutes 725 rotate around the base of the chamber and collect trim as it descends. The trim collects in the bottom of each chute. As the chute rotates past vertical exit chamber 730, the trim falls into the chamber and exits through a trim exit system (not shown).

In each of the devices employing a vertical or essentially vertical antimicrobial intervention chamber, it is important that the chamber have sufficient elongation so that the trim is airborne a sufficient time to be contacted by antimicrobial spray on all sides.

An alternative embodiment may be employed in which the trim and antimicrobial are contacted in counter-current fashion in this case by means of a "counter inverted-vortex."

In each instance, the apparatus in which the spray is injected on the trim is closed or essentially closed. Ingress and egress of the trim is controlled through trim entrance and exit devices such as that depicted in FIGS. 1-11 and 12 to recapture any antimicrobial vapor for recycling or disposal.

To facilitate the process, larger portions of trim may be chopped into smaller pieces prior to entering the closed antimicrobial application chamber.

Embodiments of the invention may include application of the antimicrobial agent by spraying in the form of a liquid mist and/or gas form. Chlorine dioxide, for example, rapidly vaporizes from aqueous solution. Accordingly spraying of a liquid solution of chlorine dioxide will necessarily subject the trim pieces to both aqueous and gaseous chlorine dioxide. The form of the spray may be selected to reflect the attributes of the particular antimicrobial agent.

Separate nozzles or spray bars may be deployed in various arrangements at various locations in or around the periphery of the apparatus to ensure that antimicrobial agent is applied to all portions of the trim. In one embodiment electrostatic spraying is employed to ensure thorough coating of the meat surfaces to facilitate the antimicrobial intervention. Where aqueous chlorine dioxide is applied electrostatically, it will generally be applied within the range of about 52° F. to about 110-113° F., as mentioned previously. In a preferred embodiment, the aqueous chlorine dioxide will be sprayed using a particle size of 50-60 microns. At this droplet size, the electrostatic charge attraction toward the meat exceeds the force of gravity ensuring that the antimicrobial will efficiently contact and attach to the meat.

Movement of the trim through the spray container is generally facilitated by gravity with or without additional forces, e.g., rotation of the container. The slope of the container can be varied provided that it effectively moves the trim through the container and in contact with the antimicrobial spray. Since chlorine dioxide is 2.5 denser than air it tends to descend in the container and congregate for removal at the bottom. It is advantageous, therefore to apply the spray at the top and let it descend with the trim, thereby, enhancing contact of the meat and the antimicrobial.

In a preferred embodiment the trim leaves the chamber after antimicrobial intervention and is delivered immediately and directly to a grinder. The ground beef is then delivered directly and immediately for packaging. All of this is to minimize further contact with sources of pathogen via the air or contact with other potential sources. Other procedures and equipment known to one skilled in the art can further minimize such contact with potential sources of pathogens.

In one embodiment of the invention, the rotating chamber for trim exiting the antimicrobial invention is directly adjacent or in contact with the grinder. In another embodiment, a hood or chamber extends from the antimicrobial intervention to the input of the grinder so that the antimicrobial agent and trim remain in contact to the point of grinding. As the treated trim enters the grinder, the gaseous antimicrobial agent is recovered.

The antimicrobial intervention described herein should result in treatment of all or essentially all of the exterior portions of the trim, i.e., the portion of the trim that would contain any contamination pre-grinding. As a result the ground beef should be essentially free from pathogens. The use of antimicrobial agent is minimized due, among other things, to recovery and recirculation. Exposure of workers to antimicrobial agent is minimized.

The invention may be employed at the packing plant or at smaller locations, e.g., a large or small butcher, even a commercial kitchen.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

The invention claimed is:

1. An apparatus for applying an antibacterial agent to meat trimmings, the apparatus comprising:
   a treating chamber;
   an entrance revolving system for introducing trimmings into the treating chamber, the entrance revolving system comprising:
      a first compartment including an opening to receive the trimmings,
      a second compartment being a closed compartment and including an inlet port for the antibacterial agent,
      a third compartment including an opening to deliver the trimmings into the treating chamber, and
      a fourth compartment being a closed compartment and including: an outlet port for evacuating the antibacterial agent, and an inlet port for drawing air into the fourth compartment to substitute the antibacterial agent evacuated from the fourth compartment;
      wherein the first, second, third, and fourth compartments rotate as a unit about a central axis,
   an application system for applying an effective amount of the antimicrobial agent to exposed surfaces of the trimmings in the treating chamber; and
   an exit revolving system for removing the treated trimmings from the treating chamber.

2. The apparatus of claim 1, wherein the exit revolving system comprises:
   a first compartment including an opening to receive the trimmings,
   a second compartment being a closed compartment and including: an outlet port for evacuating the antibacterial agent, and an inlet port for drawing air into the second compartment to substitute the antibacterial agent evacuated from the second compartment, and
   a third compartment including an opening for the treated trimmings to exit the apparatus.

3. The apparatus of claim 2, further comprising:
   an antimicrobial reservoir in communication with the outlet port of the second compartment of the exit revolving system to receive the evacuated antibacterial agent such that the evacuated antibacterial agent is recycled and reused.

4. The apparatus of claim 1, further comprising:
   an antimicrobial reservoir in communication with the outlet port of the fourth compartment of the entrance revolving system to receive the evacuated antibacterial agent such that the evacuated antibacterial agent is recycled and reused.

5. The apparatus of claim 1, wherein the entrance revolving system and the exit revolving system are rotary multi-compartment systems.

6. The apparatus of claim 5, wherein the inlet ports and the outlet ports of the entrance revolving system and the exit revolving system are located on rotating walls of the rotating compartments.

7. The apparatus of claim 5, wherein the inlet ports and the outlet ports of the entrance revolving system and the exit revolving system are located on stationary walls of the rotating compartments.

8. The apparatus of claim 1, wherein at least one of the entrance revolving system and the exit revolving system is a multi-compartment system having the compartments configured in a linear sequential format.

9. The apparatus of claim 8, wherein the multi-compartment system having the compartments configured in a linear sequential format comprises a conveyor.

10. An apparatus for applying an antibacterial agent to meat trimmings, the apparatus comprising:
    a treating chamber;
    an entrance revolving system for introducing trimmings into the treating chamber, the entrance revolving system comprising a receiving compartment to receive the trimmings and a dispensing compartment to dispense the trimmings into the treating chamber, wherein the entrance revolving system further comprises a closed compartment between the receiving compartment and the dispensing compartment, the closed compartment including an inlet port for the antibacterial agent;
    an application system for applying an effective amount of the antimicrobial agent to the trimmings in the treating chamber; and
    an exit revolving system for removing the treated trimmings from the treating chamber, the exit revolving system comprising a receiving compartment to receive the treated trimmings from the treating chamber and a dispensing compartment to dispense the treated trimmings out of the apparatus.

11. The apparatus of claim 10, wherein the treating chamber comprises a rotating hub and a series of baffles connecting to the rotating hubs to enhance the separation of trimmings and the contacts between the trimmings and the antimicrobial agent.

12. An apparatus for applying an antibacterial agent to meat trimmings, the apparatus comprising:
    a treating chamber;
    an entrance revolving system for introducing trimmings into the treating chamber, the entrance revolving system comprising a receiving compartment to receive the trimmings and a dispensing compartment to dispense the trimmings into the treating chamber;
    an application system for applying an effective amount of the antimicrobial agent to the trimmings in the treating chamber; and
    an exit revolving system for removing the treated trimmings from the treating chamber, the exit revolving system comprising a receiving compartment to receive the treated trimmings from the treating chamber and a dispensing compartment to dispense the treated trimmings out of the apparatus, wherein the exit revolving system further comprises a closed compartment between the receiving compartment and the dispensing compartment, the closed compartment including an outlet port for evacuating the antibacterial agent and an inlet port for drawing air into the closed compartment to substitute the antibacterial agent evacuated from the closed compartment.

13. An apparatus for applying an antibacterial agent to meat trimmings, the apparatus comprising:
    a treating chamber, wherein the treating chamber comprises a vertical chamber and a series of baffles and rotatable triangle to separate and temporarily render the trimmings airborne, such that the contacts between the trimmings and the antimicrobial agent are enhanced;

an entrance revolving system for introducing trimmings into the treating chamber, the entrance revolving system comprising a receiving compartment to receive the trimmings and a dispensing compartment to dispense the trimmings into the treating chamber;

an application system for applying an effective amount of the antimicrobial agent to the trimmings in the treating chamber;

an exit revolving system for removing the treated trimmings from the treating chamber, the exit revolving system comprising a receiving compartment to receive the treated trimmings from the treating chamber and a dispensing compartment to dispense the treated trimmings out of the apparatus.

14. A method for applying an antimicrobial agent to meat trimmings, the method comprising:

introducing the meat trimmings into an entrance revolving system via a first opened compartment of the entrance revolving system;

applying the antimicrobial agent to the meat trimmings in a second closed compartment of the entrance revolving system;

delivering the meat trimmings from the entrance revolving system to a treating chamber via a third opened compartment of the entrance revolving system;

evacuating the antimicrobial agent from a fourth closed compartment of the entrance revolving system while drawing in air;

applying an effective amount of the antimicrobial agent to the meat trimmings in the treating chamber;

causing the exterior portions of the meat trimmings to be exposed to the antimicrobial agent; and removing the treated trimmings from the treating chamber.

15. The method of claim 14, wherein causing the exterior portions of the meat trimmings to be exposed to the antimicrobial agent comprises temporarily suspending the meat trimmings in the air.

16. The method of claim 14, wherein applying an effective amount of the antimicrobial agent to the meat trimmings in the treating chamber comprises applying a continuous finely dispersed spray of the antimicrobial agent to the meat trimmings.

17. The method of claim 14, wherein the method is a continuous process.

18. The method of claim 14, further comprising:

removing the treated trimmings from the treating chamber via a first opened compartment of an exit revolving system;

evacuating the antimicrobial agent from a second closed compartment of the exit revolving system while drawing in air to create a sealed environment;

dispensing the treated meat trimmings from the treating chamber via a third opened compartment of the exit revolving system.

19. The method of claim 18, further comprising recycling and reusing the antimicrobial agent evacuated from the entrance revolving system and the exit revolving system.

* * * * *